United States Patent
Suzuki et al.

(10) Patent No.: US 8,838,324 B2
(45) Date of Patent: Sep. 16, 2014

(54) MONITORING AND DIAGNOSING DEVICE FOR WORKING MACHINE

(75) Inventors: Hideaki Suzuki, Hitachi (JP); Yoshinori Furuno, Tsuchiura (JP); Kozo Nakamura, Hitachiota (JP); Shinya Yuda, Hitachi (JP); Hiroki Uchiyama, Kawasaki (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 46 days.

(21) Appl. No.: 13/575,668

(22) PCT Filed: Jan. 28, 2010

(86) PCT No.: PCT/JP2010/051172
§ 371 (c)(1),
(2), (4) Date: Aug. 22, 2012

(87) PCT Pub. No.: WO2011/092830
PCT Pub. Date: Aug. 4, 2011

(65) Prior Publication Data
US 2012/0317444 A1    Dec. 13, 2012

(51) Int. Cl.
*G06F 11/30* (2006.01)
*G06F 11/00* (2006.01)
(Continued)

(52) U.S. Cl.
CPC .............. *E02F 9/2025* (2013.01); *E02F 9/264* (2013.01); *E02F 9/267* (2013.01); *B66C 13/16* (2013.01); *G05B 23/0278* (2013.01); *G06Q 10/06* (2013.01)
USPC .............................. 701/29.1; 701/50; 714/39

(58) Field of Classification Search
CPC ......... E02F 9/2025; E02F 9/264; E02F 9/267; G05B 23/0278; B66C 13/16; G06Q 10/06
USPC ...................... 701/29.1, 50; 714/39
See application file for complete search history.

(56) References Cited

U.S. PATENT DOCUMENTS 4,258,421 A * 3/1981 Juhasz et al. ............... 701/33.2
4,618,930 A * 10/1986 Ueno et al. .................. 701/20
(Continued)

FOREIGN PATENT DOCUMENTS

| JP | 5-256741 | 10/1993 |
|---|---|---|
| JP | 2000-132558 | 5/2000 |

(Continued)

*Primary Examiner* — Calvin Cheung
*Assistant Examiner* — Angelina Shudy
(74) *Attorney, Agent, or Firm* — Antonelli, Terry, Stout & Kraus, LLP.

(57) ABSTRACT

Monitoring and diagnosing device including: a classification information storage section; frequency information storage section: a first data classifier section reading out reference classification information from the classification information storage section, comparing operational data, detected by a plurality of sensors and inputted in time sequence, with the reference classification information to classify the operational data, and then generating operational data classification information; a frequency comparator section compiling the operational data classification information, generating operational data frequency information by adding, to the operational data classification information, appearance frequency information for each classification of operational data, reading out reference frequency information from the frequency information storage section, and then generating operational data frequency comparison information by comparing operational data frequency information with the reference frequency information; and an abnormality diagnosing section performing an abnormality diagnosis upon the working machine by use of the operational data classification information and operational data frequency comparison information.

12 Claims, 31 Drawing Sheets

(51) Int. Cl.
   *G06F 7/70*      (2006.01)
   *G06F 19/00*     (2011.01)
   *E02F 9/26*      (2006.01)
   *B66C 13/16*     (2006.01)
   *E02F 9/20*      (2006.01)
   *G05B 23/02*     (2006.01)
   *G06Q 10/06*     (2012.01)

(56) References Cited

U.S. PATENT DOCUMENTS

| | | | | |
|---|---|---|---|---|
| 5,710,710 | A * | 1/1998 | Owen et al. | 702/75 |
| 6,278,890 | B1 * | 8/2001 | Chassaing et al. | 600/407 |
| 6,285,947 | B1 * | 9/2001 | Divljakovic et al. | 701/110 |
| 2002/0032511 | A1 * | 3/2002 | Murakami et al. | 701/50 |
| 2006/0167659 | A1 * | 7/2006 | Miyasaka et al. | 702/185 |
| 2007/0136015 | A1 * | 6/2007 | Suzuki et al. | 702/79 |
| 2007/0233623 | A1 | 10/2007 | Vatchkov et al. | |
| 2008/0033695 | A1 * | 2/2008 | Sahara et al. | 702/185 |
| 2008/0249679 | A1 * | 10/2008 | Matsuda et al. | 701/31 |
| 2009/0228177 | A1 * | 9/2009 | Mintah et al. | 701/50 |
| 2010/0161175 | A1 * | 6/2010 | Yamada et al. | 701/35 |
| 2010/0332475 | A1 * | 12/2010 | Birdwell et al. | 707/737 |
| 2011/0016356 | A1 * | 1/2011 | Artzi et al. | 714/38 |
| 2013/0063264 | A1 * | 3/2013 | Oktem et al. | 340/540 |

FOREIGN PATENT DOCUMENTS

| | | |
|---|---|---|
| JP | 2002-288781 | 10/2002 |
| JP | 2005-241089 | 9/2005 |
| JP | 2006-11849 | 1/2006 |
| JP | 2006-276924 | 10/2006 |
| JP | 2006-349433 | 12/2006 |
| JP | 2007-257366 | 10/2007 |
| JP | 2008-196428 | 8/2008 |
| WO | WO 2008/099519 A1 | 8/2008 |

* cited by examiner

FIG. 2

| TIME | DATA ITEM A | DATA ITEM B | DATA ITEM C |
|---|---|---|---|
| TIME "1" | SENSOR VALUE A1 | SENSOR VALUE B1 | SENSOR VALUE C1 |
| TIME "2" | SENSOR VALUE A2 | DATA "B2" | SENSOR VALUE C2 |
| ⋮ | | | |
| TIME "n" | SENSOR VALUE An | SENSOR VALUE Bn | SENSOR VALUE Cn |

FIG. 3

| CLASSIFICATION NUMBER | DATA ITEM A | DATA ITEM B | DATA ITEM C | RADIUS |
|---|---|---|---|---|
| CLASSIFICATION "1" | DATA VALUE "a1" | DATA VALUE "b1" | DATA VALUE "c1" | r1 |
| CLASSIFICATION "2" | DATA VALUE "a2" | DATA VALUE "b2" | DATA VALUE "c2" | r2 |
| ... | ... | ... | ... | ... |
| CLASSIFICATION "m" | DATA VALUE "am" | DATA VALUE "bm" | DATA VALUE "cm" | rm |

FIG. 4A

| TIME | NEAREST-NEIGHBOR CLASSIFICATION NUMBER |
|---|---|
| TIME "1" | CLASSIFICATION NUMBER "k1" |
| TIME "2" | CLASSIFICATION NUMBER "k2" |
| ⋮ | ⋮ |
| TIME "n" | CLASSIFICATION NUMBER "kn" |

FIG. 4B

| TIME | NORMALIZED STATISTICAL DISTANCE |
|---|---|
| TIME "1" | d1 |
| TIME "2" | d2 |
| ⋮ | ⋮ |
| TIME "n" | dn |

FIG. 5

| CLASSIFICATION NUMBER | FREQUENCY | FREQUENCY RATIO |
|---|---|---|
| CLASSIFICATION "1" | FREQUENCY "h1" | FREQUENCY RATIO "e1" |
| CLASSIFICATION "2" | FREQUENCY "h2" | FREQUENCY RATIO "e2" |
| ⋮ | ⋮ | ⋮ |
| CLASSIFICATION "m" | FREQUENCY "hm" | FREQUENCY RATIO "em" |

| TIME DURATION DATA | TIME DURATION T |
|---|---|

601

| CLASSIFICATION NUMBER | REFERENCE FREQUENCY RATIO |
|---|---|
| CLASSIFICATION "1" | FREQUENCY RATIO E1 |
| CLASSIFICATION "2" | FREQUENCY RATIO E2 |
| ⋮ | ⋮ |
| CLASSIFICATION "m" | FREQUENCY RATIO Em |

602

EXAMPLES OF OPERATION PATTERNS IN ZONE WITH PROBLEM (TRACK TENSION STRONG)

ENGINE EXHAUST TEMPERATURE IN THIRD PERIOD

MONITORING AND DIAGNOSING DEVICE FOR WORKING MACHINE

TECHNICAL FIELD

The present invention relates to a monitoring and diagnosing device that monitors and diagnoses operating condition of working machines represented by construction machines such as hydraulic excavators.

BACKGROUND ART

Some working machines, for example, construction machines such as large hydraulic excavators operating at sites such as mines are required to continuously operate 24 hours 365 days with virtually no stop. Such machines need to be preventively maintained in their best condition by conducting maintenance operations before the machine comes to an abnormal stop. In general, special maintenance personnel periodically checks and examines the machines for abnormalities, and if an abnormality is found, a necessary maintenance operation is performed to maintain the machine in a good condition.

To perform such checking and maintenance operation, however, the machine needs to be stopped. For an operator or manager who wishes to operate the machines continuously, the checking and maintenance operations can be an operational obstacle so long as the machines are in good condition.

In view of this, abnormality-diagnosing techniques have been developed that use various sensors to analyze the machine condition and monitor for abnormalities. Importance of preventive maintenance by use of an abnormality-diagnosis technique has become recognized in view of preventing occurrence of machine trouble by detecting abnormalities and taking early maintenance measures before the machine comes to an abnormal stop.

Meanwhile, although machine manufacturers are deeply committed to developing diagnostic algorithm for abnormality diagnosis, difficulty with the development of the algorithm has prevented appropriate diagnosis to be made in some cases. The reason appropriate determination is difficult is that the experimental environment in which experiments were performed in the algorithm development differs from the operational environment and operational form in which a user uses the machines.

Under such situations, inventions have been devised that are intended to conduct determination according to measurement results obtained in an actual environment. Patent Documents 1 and 2 describe inventions that detect abnormality in machines or plant equipment using statistical properties or similarity levels of input signals indicating the operational condition of the machine or plant equipment. Patent Document 3 discloses an invention that processes data through interactive dialog with a user so as to render cluster classification appropriate. Patent Document 4 describes an invention that eliminates determination errors by detecting sensor abnormalities as well.

PRIOR ART LITERATURE

Patent Documents

Patent Document 1: JP-2005-241089-A
Patent Document 2: JP-1993-256741-A
Patent Document 3: JP-2000-1322558-A
Patent Document 4: JP-2002-288781-A

SUMMARY OF THE INVENTION

Problems to be Solved by the Invention

However, the above conventional techniques have the following problems.

In all of the above conventional techniques, statistical distance as that used in the Mahalanobis-Taguchi method is employed to classify the input data used for abnormality determination. Determination is made based on the magnitude of the statistical distance, and when the statistical distance is equal to or lower than a reference value, the machine or device of interest is determined to be normal. However, when a working machine is to operate in various manners, similarity between input signals under a normal operational state and abnormal operational state may be strong in some cases. In such cases, even if the machine state is abnormal, it is possible that the machine is erroneously determined normal as the statistical distance is equal to or below the reference value.

The present invention has been made with the above problems in mind, and an object of the invention is to provide a monitoring and diagnosing device for a working machine configured so that it can prevent erroneous determination and perform appropriate diagnosis even when strong similarity appears between input signals under a normal operational state and abnormal operational state.

Means for Solving the Problems

In order to attain the above object, the present invention provides a device for monitoring and diagnosing abnormality of a working machine in which the monitoring and diagnosing device receives and inputs in time sequence operational data of the working machine detected by a plurality of sensors and performs abnormality diagnosis on the working machine using the received operational data, the monitoring and diagnosing device comprising: a classification information storage section in which reference classification information is stored; a frequency information storage section in which reference frequency information is stored; a first data classifier section which reads out the reference classification information from the classification information storage section, compares the operational data, which were detected by the plurality of sensors and inputted in time sequence, with the reference classification information to thereby classify the operational data, and then generates operational data classification information; a frequency comparator section which compiles the operational data classification information, generates operational data frequency information by adding, to the operational data classification information, appearance frequency information for each of the classifications of the operational data, reads out the reference frequency information from the frequency information storage section, and then generates operational data frequency comparison information by comparing the operational data frequency information with the reference frequency information; and an abnormality diagnosing section which performs an abnormality diagnosis upon the working machine by use of the operational data classification information and the operational data frequency comparison information.

According to the monitoring and diagnosing device, abnormality diagnosis on a working machine is performed using not only the operational data classification information but also the operational data frequency comparison information. Therefore, even when the similarity between input signals under a normal operational state and an abnormal operational state is strong, the present invention prevents erroneous determination and enables an appropriately diagnosis to be carried out.

Preferably, the monitoring and diagnosing device further comprises a display unit which displays at least one of the operational data frequency comparison information generated by the frequency comparator section and diagnostic result data from the abnormality diagnosing section.

Therefore, in a case where operational data frequency comparison information is displayed, whether an abnormality exists can be detected or confirmed based on the user's judgment. In a case where diagnostic result data is displayed, the user can know detailed abnormality information.

Preferably, the abnormality diagnosing section diagnoses that the operational data is abnormal when, as a result of an abnormality diagnosis upon the working machine using the operational data frequency comparison information, a predetermined difference is detected between the operational data frequency information and the reference frequency information; and the display unit displays the diagnostic results.

Preferably, when the predetermined difference is detected between the operational data frequency information and the reference frequency information, the display unit displays part of the operational data classification information related to the difference.

The user can then obtain further detailed abnormality information.

Preferably, the first data classifier section extracts only pre-selected reference classification information of all the reference classification information stored in the classification information storage section, and also extracts only operational data associated with the pre-selected reference classification information of all the operational data detected by the plurality of sensors and inputted in time sequence, and then compares the extracted operational data with the extracted reference classification information to generate the operational data classification information.

Excluding, for instance, data of a non-operating period as above, the frequency comparator section can produce more accurate operational data frequency comparison information that are not affected by a non-operating time, and consequently an appropriate diagnosis at a lower determination error rate can be carried out.

Preferably, the monitoring and diagnosing device further comprises a classification information generator section which receives and inputs in time sequence operational data of the working machine detected by the plurality of sensors, compares the similarity of the operational data to each other to classify the operational data, and generates reference classification information which are stored into the classification information storage section.

The monitoring and diagnosing device can thus create reference classification information in advance and store them into the classification information storage section.

Preferably, the monitoring and diagnosing device further comprises:

a second data classifier section which compares operational data, which were detected by the plurality of sensors and inputted in time sequence, with the reference classification information generated by the classification information generator section, classifies the operational data by the comparison, and generates operational data classification information; and a frequency information generator section which compiles the operational data classification information, adds thereto appearance frequency information for each of the classifications of the operational data, and thus generates reference frequency information which are stored into the frequency information storage section.

The monitoring and diagnosing device can thus create reference frequency information in advance and store them in the frequency information storage section.

Effects of the Invention

According to the present invention, a monitoring and diagnosing device can adaptively learn operational states of a working machine that works in various manners, and even when strong similarity appears between the input signals under a normal operational state and abnormal operational state, erroneous determination can be prevented to carry out an appropriate diagnosis.

BRIEF DESCRIPTION OF THE DRAWINGS

FIG. 2 is a diagram showing the structure of operational data input to the monitoring and diagnosing device;

FIG. 3 is a diagram showing the structure of classification data (reference classification information) read out from a classification information storage section;

FIG. 4A is a diagram showing the data structure of a nearest-neighbor classification number (operational data classification information) created by a data classifier section;

FIG. 4B is a diagram showing the data structure of normalized statistical distances "d" (operational data classification information) created by the data classifier section;

FIG. 5 is a diagram showing a frequency table created by a frequency comparator section;

FIG. 6 is a diagram showing time duration data and a reference frequency table, both read out from a frequency information storage section;

MODES FOR CARRYING OUT THE INVENTION

Hereunder, embodiments of the present invention will be described using the accompanying drawings.

First Embodiment

Figure 1:
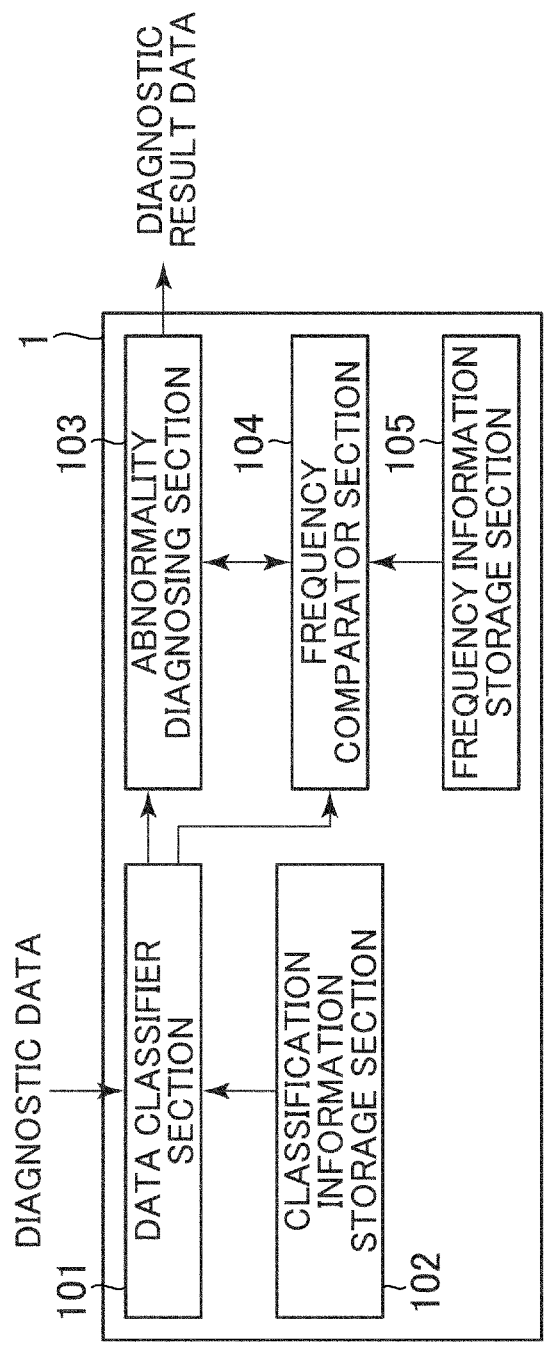
FIG. 1 is a diagram showing the configuration of a monitoring and diagnosing device according to a first embodiment of the present invention.

FIG. 1 is a diagram showing the configuration of a monitoring and diagnosing device according to a first embodiment of the present invention.

The monitoring and diagnosing device 1 includes a data classifier section 101 (a first data classifier section), a classification information storage section 102, an abnormality diagnosing section 103, a frequency comparator section 104, and a frequency information storage section 105.

A working machine, which is to be subjected to the monitoring and diagnosis, is provided with a plurality of sensors for detecting operational states thereof. The values detected by these sensors (sensor values) are computerized and then input as operational data to the monitoring and diagnosing device 1.

FIG. 2 is a diagram showing the structure of operational data input to the monitoring and diagnosing device 1. As shown in FIG. 2, sensor value information of the operational data is respectively associated with data items A to C, and the sensor value of each data item is associated with time-of-day information (hereinafter simply referred to as time information) as time-series data. FIG. 2 shows operational data of three data items A to C of time "1" to "n".

In the present embodiment, operational data is separated and described in two kinds according to their purposes of use. One kind is diagnostic data, and the other kind is learning data. The operational data input to the monitoring and diagnosing device 1 of the present embodiment is the diagnostic data, and the input diagnostic data is diagnosed to derive diagnostic result data. Description on the learning data will be made later herein.

When operational data is input as diagnostic data to the monitoring and diagnosing device 1, the diagnostic data is input into the data classifier section 101. The data classifier section 101 reads out classification data as reference classification information from the classification information storage section 102 and compares the diagnostic data with the classification data. FIG. 3 is a diagram showing the structure of the classification data (reference classification information). As shown in FIG. 3, each classification data is associated with respective data values of the data items and radius data. The classification data (reference classification information) were created in advance from operational data input as the learning data (described later herein).

In the data classifier section 101, of the diagnostic data, one set of sensor values at each time-of-day, for example, at time "1", an integrated set of sensor values A1, B1, and C1 are treated as one vector. Similarly, of the classification data, one set of data values of each classification number, for example, regarding classification "1", an integrated set of data values "a1", "b1", and "c1" are treated collectively as one vector. The data classifier section 101 compares each vector of the sensor values in the diagnostic data with the vectors of the data values in the classification data. For the comparison, statistical distances D between vectors are calculated using a calculation method such as Expression 3 that follows herein.

When a vector X has components from x1 to xp, as shown in Expression 1, and a vector Y has components from y1 to yp, as shown in Expression 2, the Euclidean distance D between the two vectors are calculated by Expression 3.

The data classifier section 101 calculates the statistical distances between one vector of one sensor value set in the diagnostic data at one time and all of the vectors of the data values in the classification data. The classification number at which the statistical distance D becomes the smallest is selected as a nearest-neighbor classification number (operational data classification information), and the number is output to the frequency comparator section 104. The nearest-neighbor classification number (operational data classification information) output to the frequency comparator section 104 is associated with time information as time-series data, as shown in FIG. 4A.

(Expression 1)

$$X=(x_1,x_2,\ldots x_p) \quad (1)$$

(Expression 2)

$$Y(y_1,y_2,\ldots y_p) \quad (2)$$

(Expression 3)

$$D=\sqrt{(x_1-y_1)+(x_2-y_2)+\ldots+(x_p-y_p)} \quad (3)$$

Here, the statistical distance D of the nearest-neighbor classification number, more specifically, the statistical distance D between the vector of the data values in the classification data corresponding to the nearest-neighbor classification number and the one vector of the one sensor value set in the diagnostic data is defined as the nearest-neighbor distance. As shown in Expression 4, the data classifier section 101 divides the nearest-neighbor distance by the radius data "r" of the classification data that corresponds to the nearest-neighbor classification number to obtain a normalized statistical distance "d" (operational data classification information), and the normalized statistical distance "d" is output to the abnormality diagnosing section 103. The normalized statistical distance "d" output to the abnormality diagnosing section 103 is associated with time information as time-series data, as shown in FIG. 4B.

(Expression 4)

$$d=D\div r \quad (4)$$

In such a way, the data classifier section 101 calculates the nearest-neighbor classification number and normalized statistical distance "d" as operational data classification information, and outputs the former to the frequency comparator section 104 and the latter to the abnormality diagnosing section 103.

Incidentally, the data classifier section 101 may extract, of all the classification data (reference classification information) stored in the classification information storage section 102, only classification data that has been selected by a user beforehand. Then, of all input diagnostic data (operational data), only the diagnostic data corresponding to the selected classification data are extracted, and the extracted diagnostic data and classification data are compared to thereby generate operational data classification information (nearest-neighbor classification number and normalized statistical distance).

The frequency comparator section 104 compiles nearest-neighbor classification numbers that have been input from the data classifier section 101 thorough a predetermined duration. The predetermined duration is read out from the frequency information storage section 105 and referred to by the frequency comparator section 104 as duration data 601 as shown in FIG. 6. Assume here that the nearest-neighbor classification numbers, input from the data classifier section 101, are classification numbers "k1" to "kn" that respectively correspond to the time "1" to "n", as shown in FIG. 4A. Each of the classification numbers "k1" to "kn" in FIG. 4A is one of the classification numbers of classification "1" to "m" in the classification data shown in FIG. 3. The frequency comparator section 104 analyzes, for each classification number "k1" to "kn", which of the classifications "1" to "m" corresponds thereto, calculates the appearance frequency of each classification number (i.e., the appearance count of each classification number), and then creates a frequency table 501 such as the one shown in FIG. 5. Frequencies "h1" to "hn" are tabulated in association with the classifications "1" to "m" in the frequency table 501. Based on the frequency table 501 and the duration data 601 shown in FIG. 6, frequency ratios "e1" to "em" are calculated as operational data frequency information. To be more specific, as shown in Equation 5, the frequency comparator section 104 calculates the frequency ratios by dividing the frequency of each classification by duration T. Thus, comparison not depending on the duration T can be executed.

(Expression 5)

$$e_i=h_i\div T \text{ (where } i=1,\ldots m) \quad (5)$$

Figure 21:
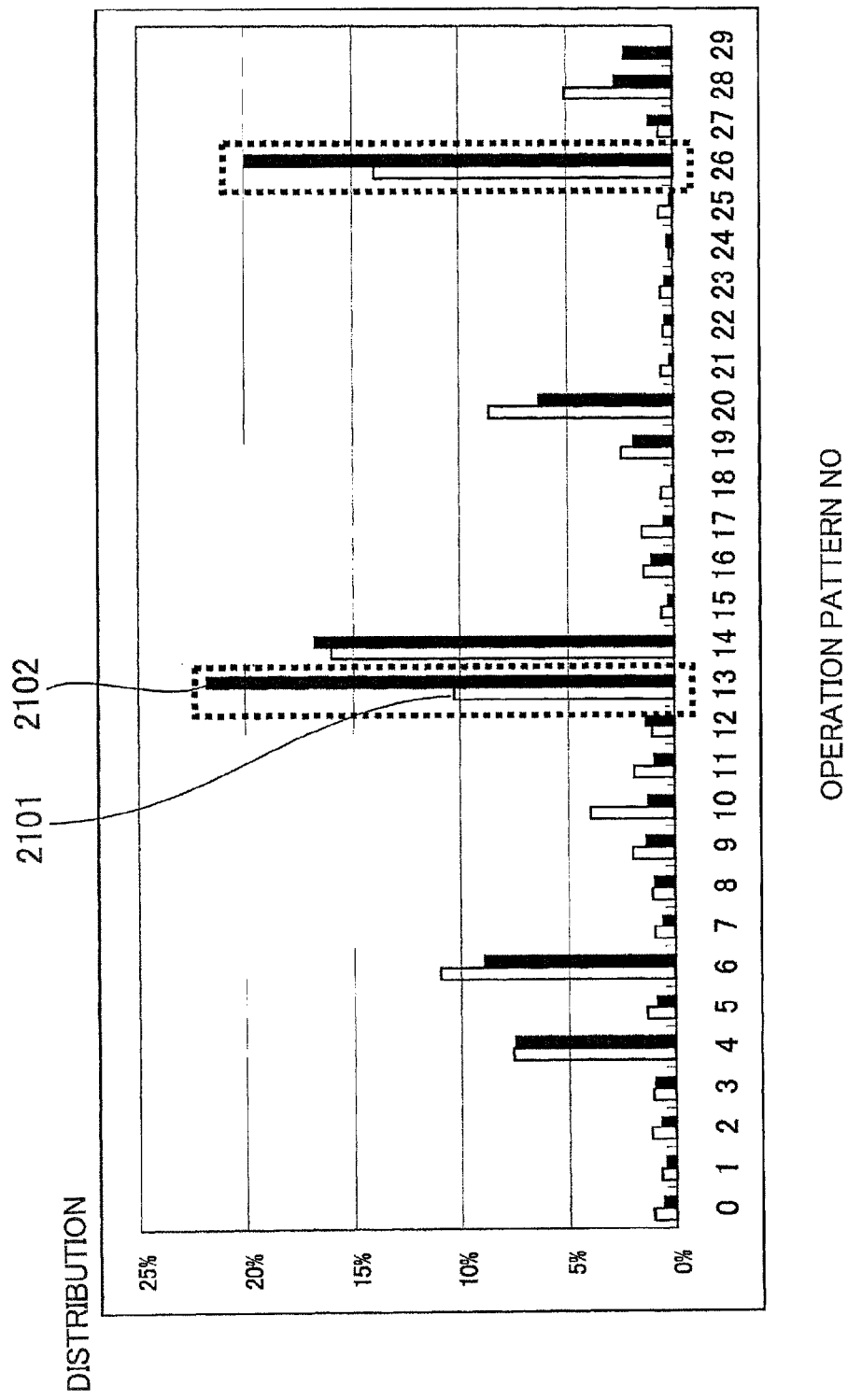
FIG. 21 is a diagram that compares the frequencies of operation patterns (operational data classifications) obtained during an abnormal operation period with those of a normal operation period, and the diagram is also a display example of frequency comparison data.

The frequency comparator section 104 compares the frequency ratios (operational data frequency information) in the frequency table 501 and the frequency ratios (reference frequency information) in such a reference frequency table 602 as the one shown on the right in FIG. 6, which are read out from the frequency information storage section 105, and thus creates frequency comparison data (operational data frequency comparison information). The reference frequency ratios E1 to Em are tabulated in association with the classifications "1" to "m" in the reference frequency table 602 of FIG. 6. The reference frequency ratios (reference frequency information) in the reference frequency table 602 were created in advance from the operational data as learning data (described later herein). The comparison of the frequency comparison data (operational data frequency comparison information) may be carried out using absolute difference values derived as in Expression 6 or test rates of the frequency ratios derived as in Expression 7. The differences, or "Diff" in Expression 6, or the test rate, or "Rate" in Expression 7 are the frequency comparison data generated by the frequency comparator section 104. In addition, if the frequency comparison data is to be used only for displaying on a screen of a display unit, the frequency comparison data may be a graphical representation containing the operational data reference information and the reference frequency information, as shown in FIG. 21.

(Expression 6)

$$\text{Diff}_i=|e_i-E_i| \text{ (where } i=1,\ldots m) \quad (6)$$

(Expression 7)

$$\text{Rate}_i=e_i\div E_i \text{ (where } i=1,\ldots m) \quad (7)$$

The abnormality diagnosing section 103 performs abnormality diagnosis of the operational data using the normalized statistical distance output from the data classifier section 101 and the frequency comparison data output from the frequency comparator section 104. The diagnosis is conducted in the following manner.

First, the abnormality diagnosing section 103 determines the diagnostic data to be in the normal range when the normalized statistical distance output from the data classifier section 101 is one or less, whereas it determines, when the normalized statistical distance is greater than one, the diagnostic data not to be in the normal range, that is, to be abnormal. The criterion value is one because normalization as shown in Expression 4, i.e., dividing the normalized statistical distance by the radius data of the corresponding nearest-neighbor classification number is performed so that the data (statistical distance) would not depend on the classification number. This diagnosis is conducted upon diagnostic data of each time that has been input to the data classifier section 101. The abnormality diagnosing section 103 compiles the diagnostic results of each time, and derives the abnormality diagnostic results of the diagnostic data according to the statistical distances by use of such a criterion as whether data are continuously diagnosed abnormal within a predetermined time period, or whether a time in which data are diagnosed abnormal within a predetermined time period is over a predetermined rate. Direct use of the individual diagnostic result of each time is avoided to suppress false or dummy reporting. If the abnormality diagnosing section 103 collects diagnostic information inputted within a predetermined time and determines the diagnostic information to be abnormal, this would be the output of the monitoring and diagnosing device 1 as the diagnostic result data according to statistical distances.

Conversely, if the abnormality diagnosing section 103 collects diagnostic information inputted within a predetermined time and determines the diagnostic information to be normal, the abnormality diagnosing section 103 receives frequency comparison data sent from the frequency comparator section 104, and diagnoses whether there is a classification number whose corresponding frequency comparison data is greater or smaller than a predetermined rate. Here, it is assumed that the frequency comparison data were calculated using Expression 7. In the frequency comparator section 104, when the frequency ratio of one classification of diagnostic data is about the same as the frequency ratio of its corresponding reference frequency read out from the frequency information storage section 105, the test rate of that classification ought to be close to one. If the test rate takes a value larger than one, for example, 1.5 or 2.0, it indicates that the frequency ratio of the diagnostic data is high concerning the frequency ratio of the corresponding classification. If the test rate is smaller than one, it indicates that the frequency ratio of the diagnostic data is low concerning the frequency ratio of the corresponding classification. This diagnosis based on the magnitude of the test rate is performed for each classification. If the test rates of all classifications stay within a predetermined range, the diagnostic data is determined to be normal and the result would be the output of the monitoring and diagnosing device 1 as the diagnostic result data according to the frequency information.

Figure 7:
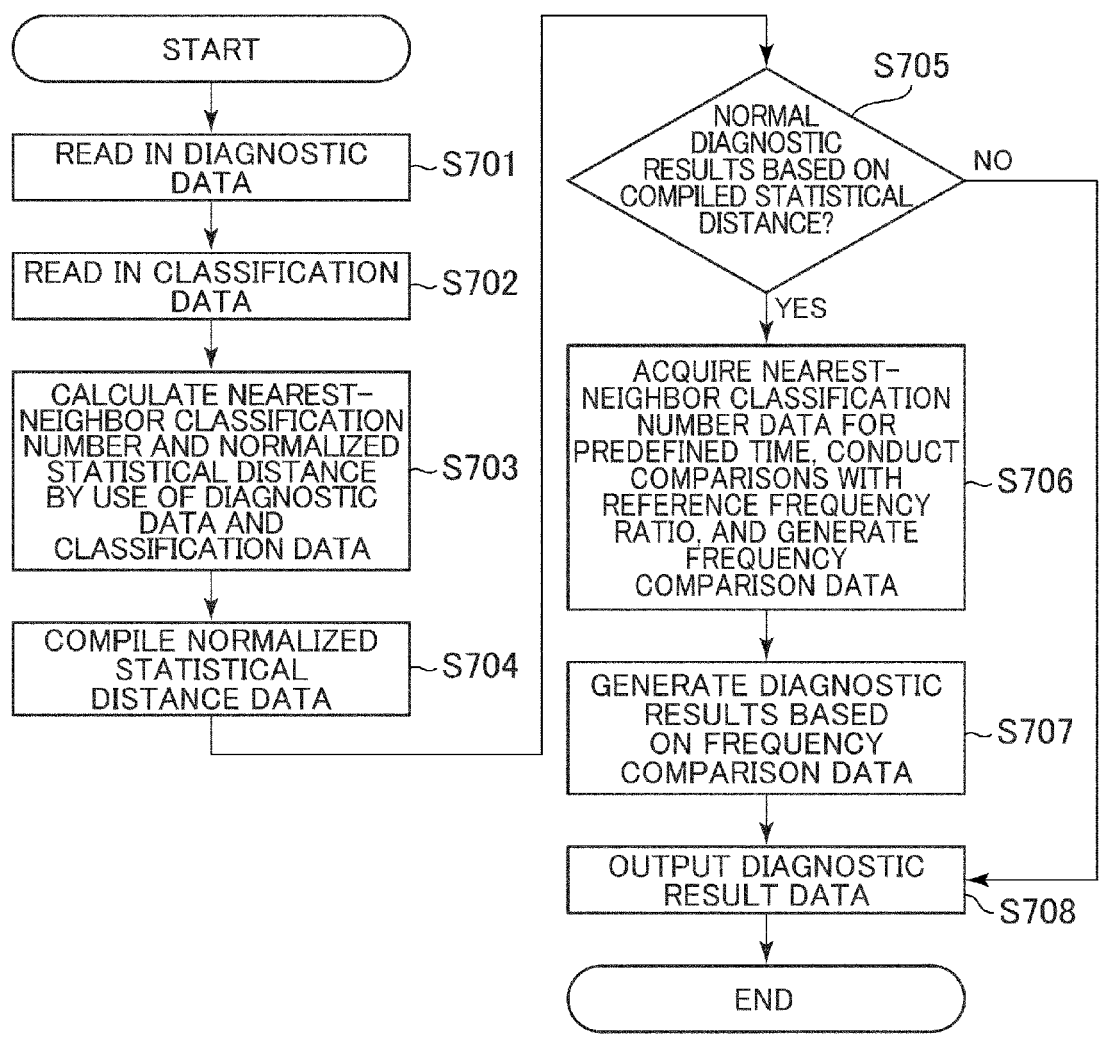
FIG. 7 is a diagram showing a process flow of a diagnosis performed by the monitoring and diagnosing device.

FIG. 7 is a process flow diagram of the above diagnostic processing performed by the monitoring and diagnosing device 1.

In the monitoring and diagnosing device 1, the data classifier section 101 reads in diagnostic data from an external element (step s701) and also reads in classification data from the classification information storage section 102 (step s702). After this, the data classifier section 101 compares the diagnostic data and the classification data and generates nearest-neighbor classification numbers and normalized statistical distances (step s703). Next, the abnormality diagnosing section 103 receives and compiles the normalized statistical distances from the data classifier section 101 at a predetermined duration of time (step s704) to diagnose for abnormalities (step s705). When the operational data is determined to be abnormal, process skips to step s708, and information indicating that the abnormality diagnostic results according to statistical distances suggest abnormality in the operational data would be the output of the monitoring and diagnosing device 1. Conversely, if the abnormality diagnosing section 103 determines that, as a result of the abnormality diagnosis after compiling the normalized statistical distances, the operational data are normal, process proceeds to step s706. The frequency comparator section 104 receives and collects the nearest-neighbor classification numbers from the data classifier section 101 at a predetermined duration of time. Then, reference frequency ratios are read in from the frequency information storage section 105, and the frequency ratios of the compiled nearest-neighbor classification numbers are compared with the reference frequency ratios to thereby generate frequency comparison data (step s706). The abnormality diagnosing section 103 generates diagnostic results according to the frequency comparison data (step s707). Finally, the monitoring and diagnosing device 1 outputs as the result of the diagnosis that the abnormality diagnostic result according to statistical distances is normal, and in addition, whether the abnormality diagnostic result according to frequency ratios indicates the operational data to be normal or abnormal.

Figure 8A:
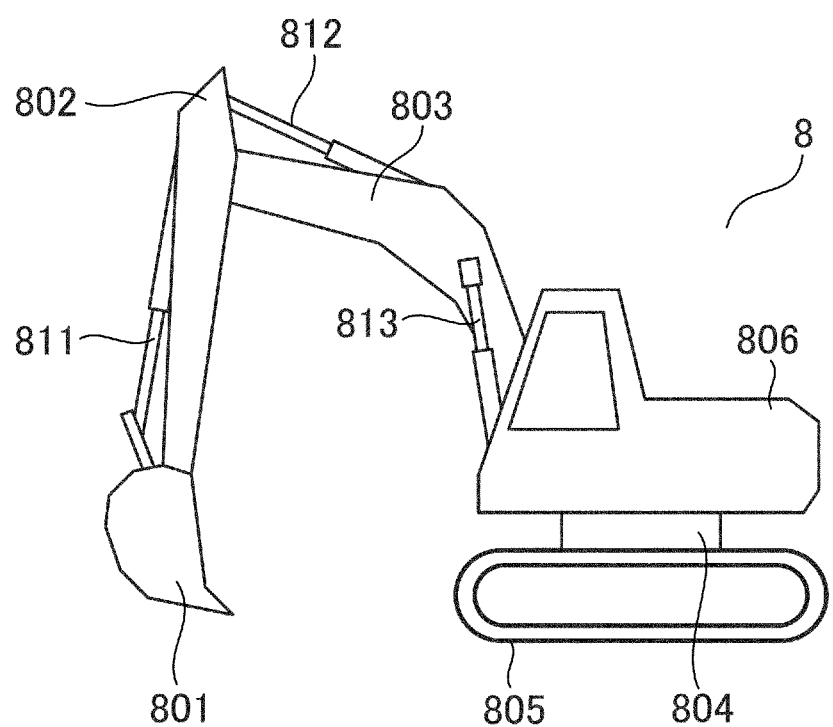
FIG. 8A is a side view of a hydraulic excavator showing part of the configuration thereof.
Figure 8B:
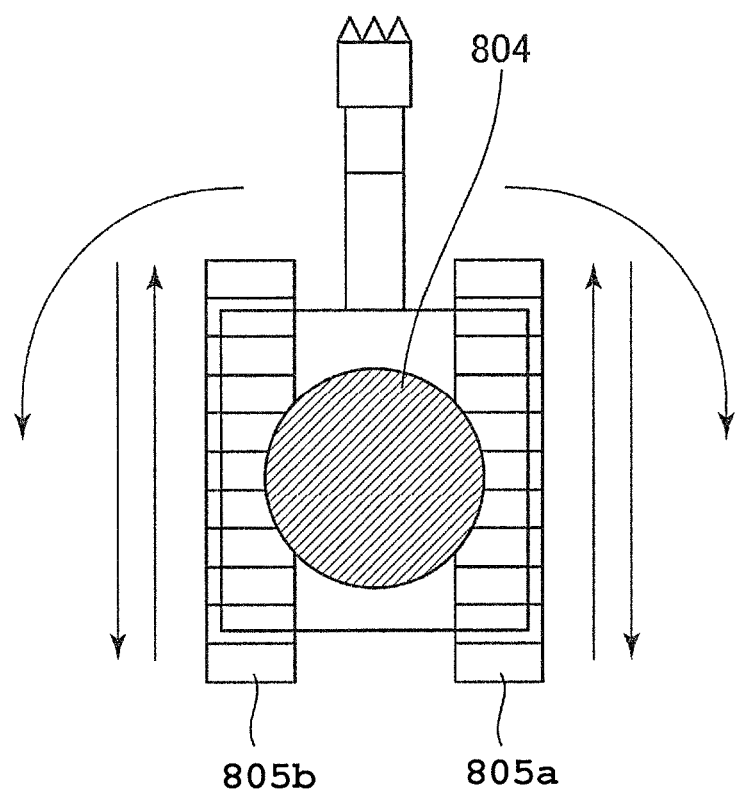
FIG. 8B is a top view of the hydraulic excavator showing part of the configuration thereof.

The configuration and operation of the hydraulic excavator are described below using FIGS. 8A and 8B. The hydraulic excavator 8 can perform excavation and other operations with the equipped actuating mechanisms. A bucket 801, an arm 802, and a boom 803 are actuated by hydraulic cylinders 811, 812 and 813. These elements related to excavation are usually collectively called the front. Expansion/contraction of the cylinders 811 to 813 actuates the bucket 801, the arm 802, and the boom 803. The hydraulic excavator 8 is also mounted with a vehicle body controller (control unit, described later) for controlling each actuating mechanism and collecting/monitoring the information sent from sensors. Additionally, as shown in FIG. 8A, the hydraulic excavator 8 includes a swinging mechanism 804 that rotates a main body 806 of the vehicle, and a crawler unit 805 as a traveling mechanism for the entire hydraulic excavator. The swinging mechanism 804 is equipped with a hydraulic motor (not shown), and the body 806 can swing horizontally with respect to the traveling mechanism by driving the hydraulic motor of the swinging mechanism 804.

The crawler unit 805 includes a right crawler 805*a* and a left crawler 805*b*, designed such that each can operate independently. Pressure sensors for measuring the tension control state of the crawlers 805*a* and 805*b* are also provided, and data from these sensors are monitored by the controller. The hydraulic excavator can travel forward when the right crawler 805*a* and the left crawler 805*b* are both rotating in the forward direction, as shown in FIG. 8B. Meanwhile, for example, when the right crawler 805*a* rotates forward and the left crawler 805*b* rotates backward, the entire hydraulic excavator will rotate counterclockwise.

Figure 9:
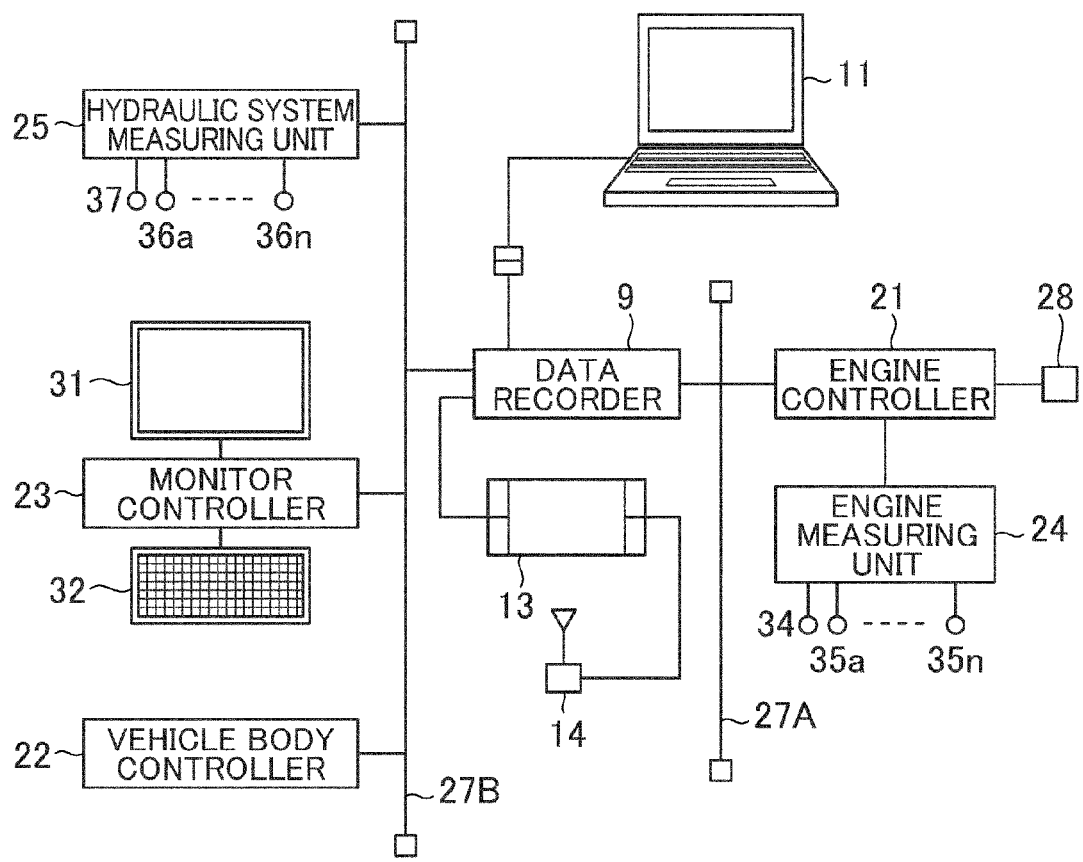
FIG. 9 is a diagram showing a controller network incorporated in the hydraulic excavator.

FIG. 9 shows the controller network installed in the hydraulic excavator. The controller network for the hydraulic excavator includes an engine controller 21, the vehicle body controller 22, a monitor controller 23, an engine measuring unit 24, a hydraulic system measuring unit 25, and a data recorder 9. The engine measuring unit 24 is connected to the engine controller 21, and the engine controller 21 is connected to the data recorder 9 via a first common communication line 27A. The vehicle body controller 22, the monitor controller 23, and the hydraulic system measuring unit 25 are connected to the data recorder 9 via a second common communication line 27B.

The engine controller 21 controls an electronic governor 28 to thereby control the fuel injection rate of the engine. The vehicle body controller 22 is driven by the engine and controls a main pump that supplies hydraulic fluid to actuators such as the hydraulic cylinders and the hydraulic motor, and to other hydraulic equipment. The monitor controller 23 is connected to a display unit 31 and an operating section 32, and performs control relative to displaying on the display unit 31 in accordance to an input operation through the operating section 32.

The engine measuring unit 24 receives and collects detection signals that are input from sensors for detecting state quantities of various devices and units relating to the engine. FIG. 9 shows as the sensors for detecting the state quantities a rotational speed sensor 34 that detects the rotational speed of the engine and temperature sensors 35a to 35n that detect the temperatures of exhaust gases released from the cylinders of the engine. In the case of a very large hydraulic excavator, the number of cylinders in the engine is, for example, 16 and that of temperature sensors 35a to 35n is also 16 (n=16).

The hydraulic system measuring unit 25 receives and collects detection signals that are input from sensors for detecting state quantities of various devices and units relating to the hydraulic system. FIG. 9 shows as the sensors for detecting the state quantities pressure sensors 36a to 36n that detect operating pilot pressures generated by control lever devices (the operating pilot pressures are hereinafter referred to simply as the operating pressures), and a pressure sensor 37 that detects track tension (pressure). The control lever devices specify the operation of the boom, arm, and bucket as well as operations such as swinging and traveling. The control valve switches in accordance to the generated operating pressure, whereby the flow of hydraulic fluid supplied to the actuators such as the hydraulic cylinder and the hydraulic motor are controlled and in turn the operation of the actuators would be controlled. Thus, the operation of the boom, arm, and bucket and other operations such as swinging and traveling are controlled.

The data recorder 9 receives, in addition to the state quantity data collected by the engine measuring unit 24 and the hydraulic system measuring unit 25, data that are necessary among the input and output data of the engine controller 21, the vehicle body controller 22, and the monitor controller 23 at predetermined time intervals via the first and second common communication lines 27A and 27B. The received data are recorded as sensor data in the data recorder 9.

The vehicle body controller 22 includes the monitoring and diagnosing device 1. In order to conduct the diagnostic processing shown in FIG. 7, the controller 22 accesses the data recorder 9 to collect and record sensor data of a predetermined time period (information on the various sensors collected by the engine measuring unit 24 and the hydraulic system measuring unit 25) that have been stored in the data recorder 9, and monitors the data.

In addition, a personal computer 11 can be connected to the data recorder 9. Downloading the sensor data stored in the data recorder 9 into the personal computer 11, the diagnosis of the hydraulic excavator can likewise be conducted by using a monitoring and diagnosing device 1 installed in the personal computer 11. Alternatively, the sensor data stored in the data recorder 9 can be periodically transmitted via a wireless device 13 and an antenna 14 to a server (not shown) in a management/control office. The diagnosis of the hydraulic excavator can then be conducted at the administration/control office.

Next, beneficial operational effects of the present embodiment having the above configuration are described below.

Figure 10:
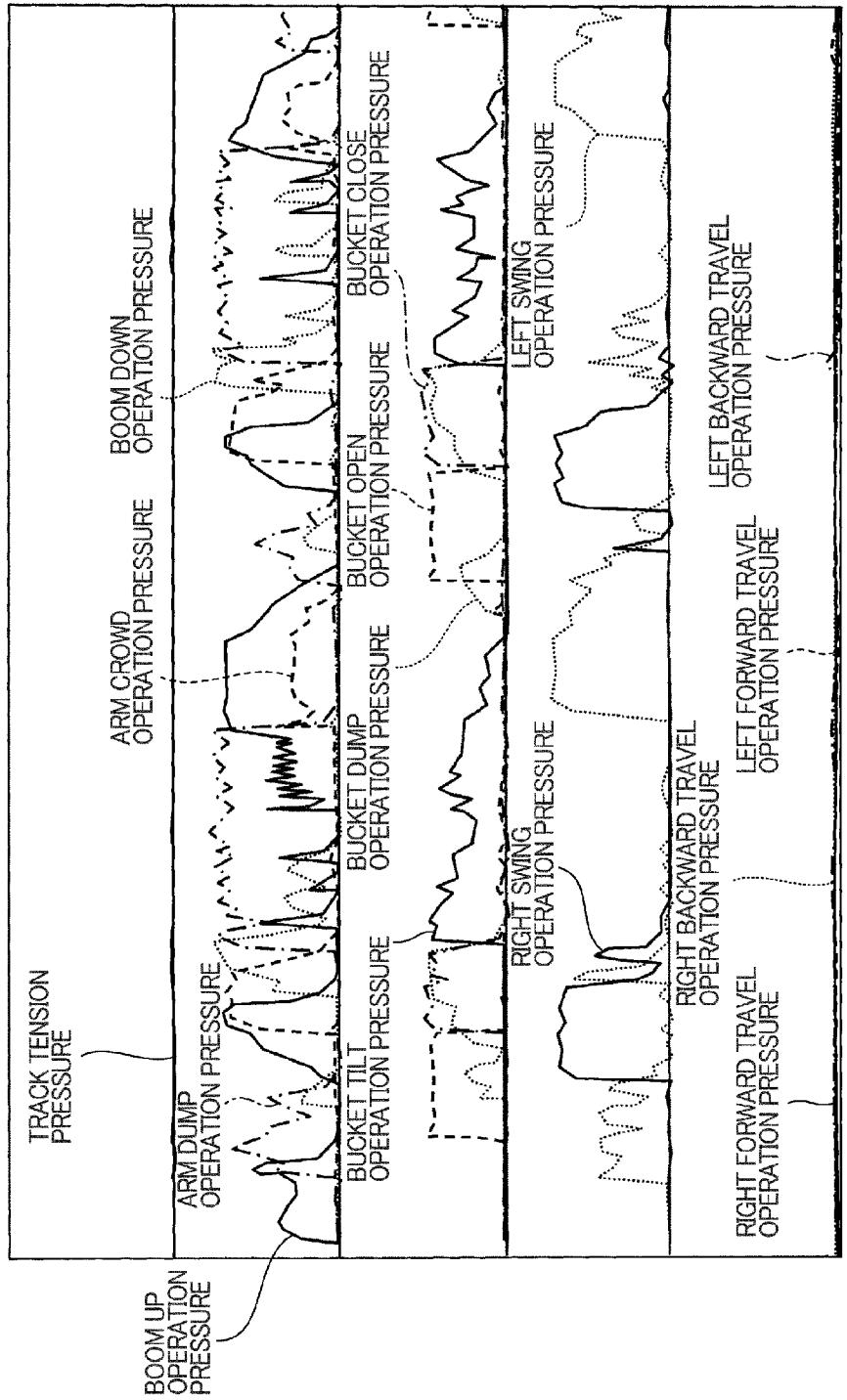
FIG. 10 is a diagram that shows operating pressures (operational data) and track tension (pressure) measured by pressure sensors and recorded and monitored by a vehicle body controller, the diagram showing the operational data obtained during a normal operational state.
Figure 11:
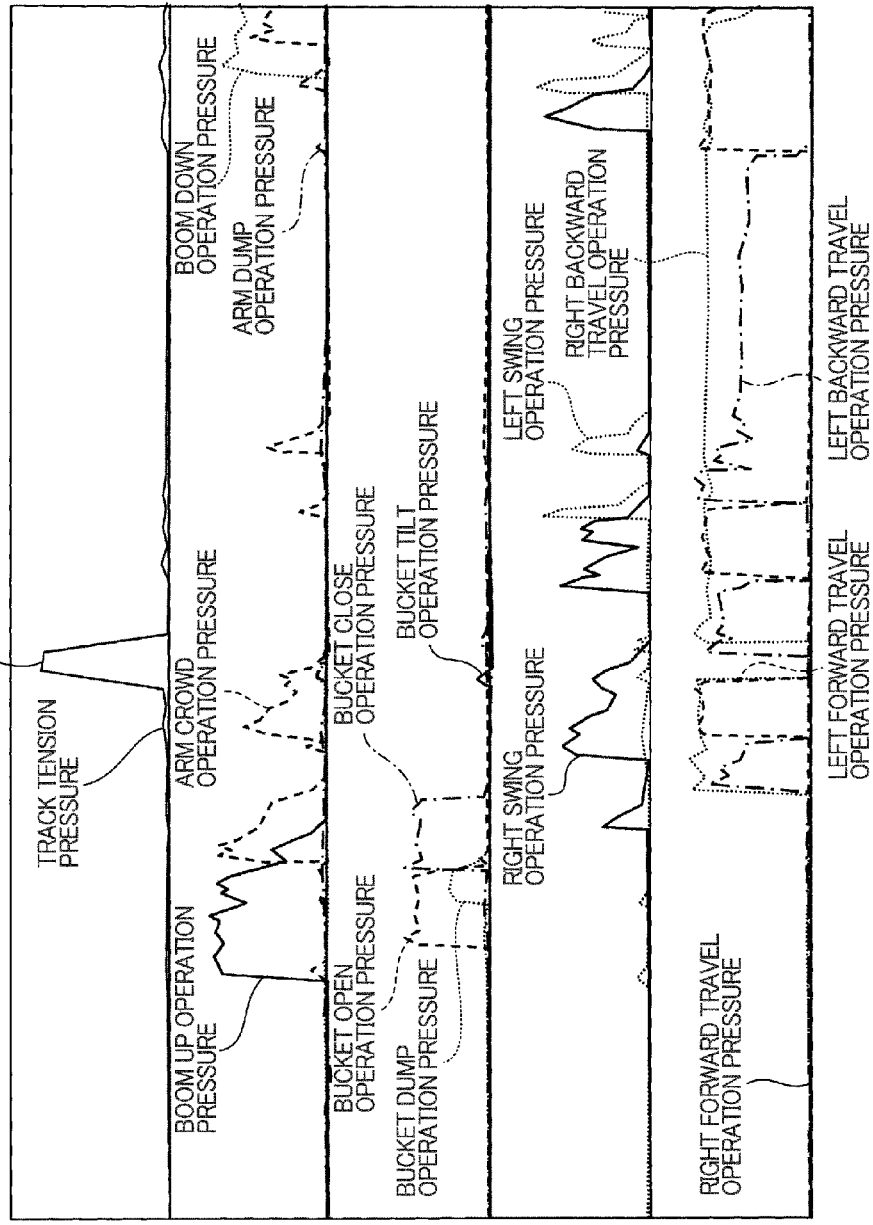
FIG. 11 is a diagram that shows operating pressures (operational data) and track tension (pressure) measured by the pressure sensors and recorded/monitored by the vehicle body controller, the diagram showing the operational data obtained during an abnormal operational state.

FIGS. 10 and 11 are graphs showing the operating pressures (operational data) and track tension (pressure) measured by the pressure sensors 36a to 36n, 37 and recorded and monitored by the vehicle body controller 22 (monitoring and diagnosing device 1). FIG. 10 shows the operational data obtained during normal operation, and FIG. 11 shows the operational data obtained during abnormal operation. In FIGS. 10 and 11, track tension (pressure) is presented at the uppermost row, and below that the boom operating pressure, arm operating pressure, bucket operating pressure, swinging pressure, and traveling pressure are shown in that order.

Figure 12:
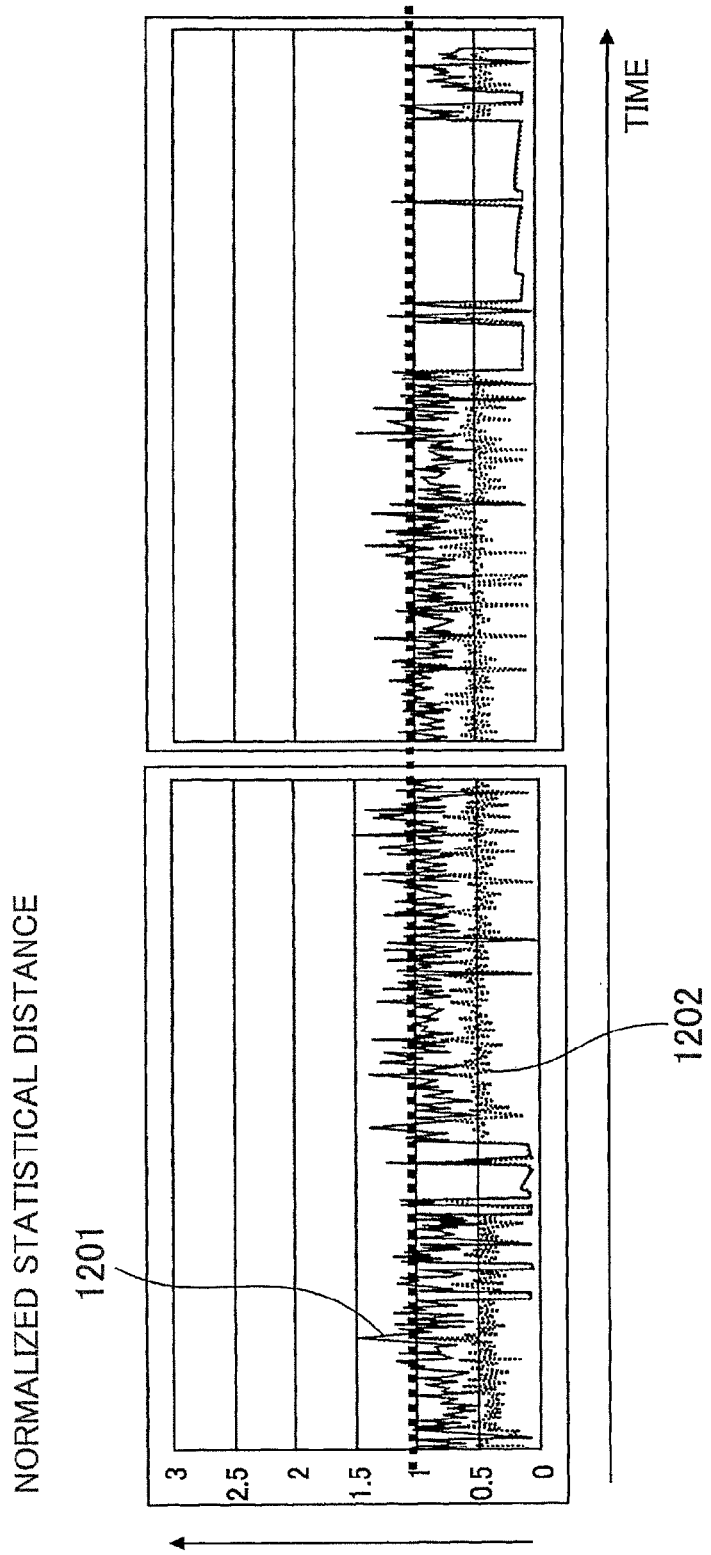
FIG. 12 is a diagram that shows normalized statistical distances of respective time-of-day in the order that the operational data were input, and the diagram also shows moving average values thereof of a predetermined time (here, 50 unit time)

Track tension (pressure) abnormality 1101 is detected in FIG. 11, and this abnormality is recorded by the monitoring and diagnosing device 1. Of all operational data exclusive of the data on track tension (pressure), the operational data obtained during normal operation are learned by a learning unit. From the learned data, operation pattern data (reference classification information) and operation frequency data (reference frequency information) are created and stored beforehand inside the classification information storage section 102 and the frequency information storage section 105 in the monitoring and diagnosing device 1, which are shown in FIG. 1. When operational data of when the vehicle is operating abnormally is input to the monitoring and diagnosing device 1, the previously stored operation pattern data (reference classification information) and the pressure sensor values of the operational data are compared, as shown in FIG. 12. For each operational data, the operation pattern with which the statistical distance become the smallest is selected, and the nearest-neighbor statistical distance D relative to that operation pattern is calculated, and then the normalized statistical distance "d" is calculated. Referring to FIG. 12, the horizontal axis represents the operation time of the machine (in the order that the operational data were input), and the vertical axis represent the normalized statistical distance. FIG. 12 shows the normalized statistical distance 1201 at each time-of-day and also the moving average values 1202 of the distances 1201 in a predetermined time (here, 50 unit time). It can be seen that even under abnormal operation, the moving average values of the normalized statistical distances are no larger than the threshold level one, and there is no significant difference with respect to the operation pattern data corresponding to normal operation.

Figure 13:
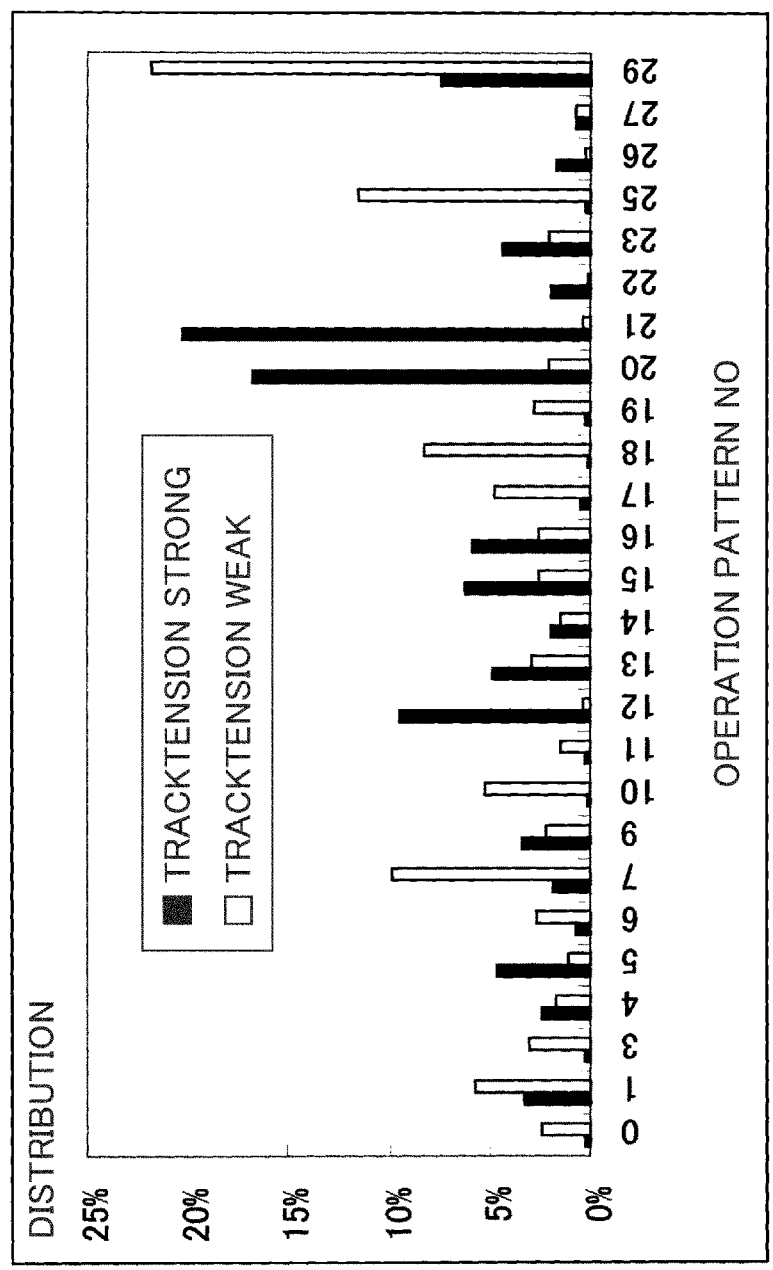
FIG. 13 is a diagram that shows frequency ratios of operation patterns of when track tension is too high (abnormal operation) and those of when track tension is low (normal operation)
Figure 14:
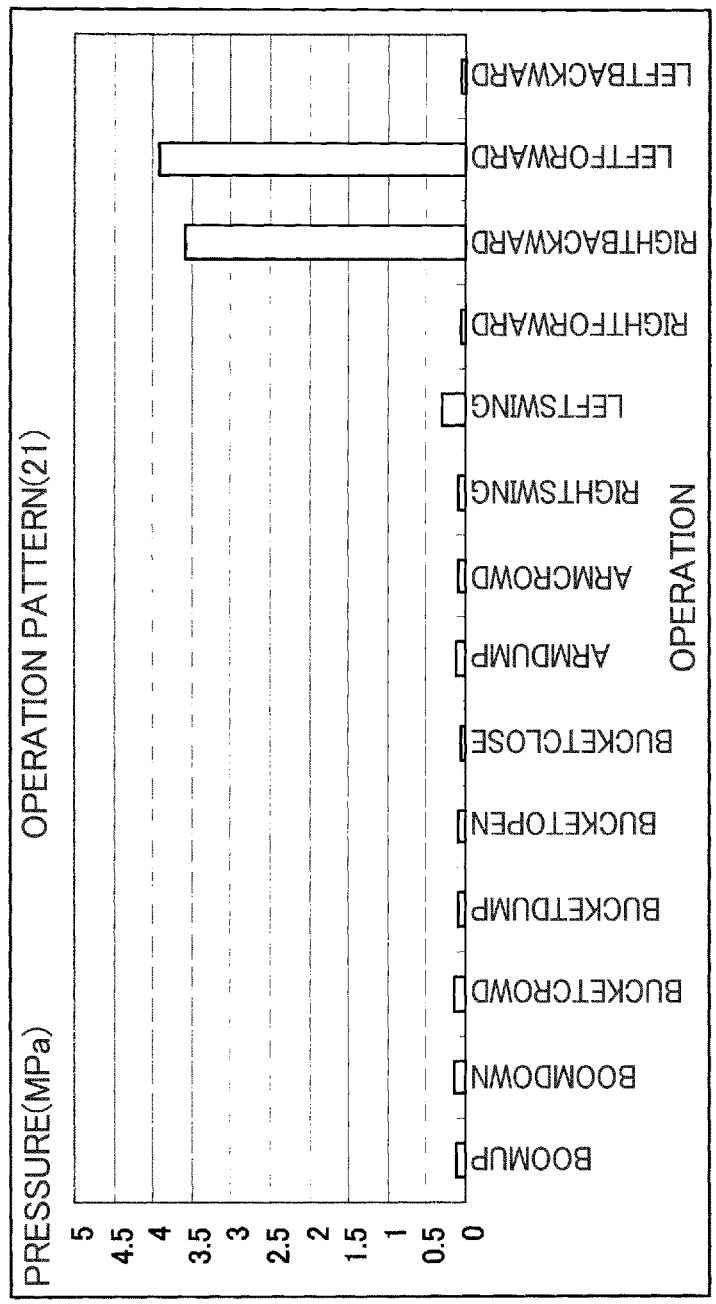
FIG. 14 is a diagram that shows the specific operation patterns of the identification number which has the highest frequency in the abnormal operation.

FIG. 13 is a diagram showing the frequency ratios of respective operation patterns appearing when the track tension is too strong (abnormal operation), and those of when the track tension is weak (normal operation). The horizontal axis denotes the operation patterns of the machine (i.e., classification data of operational data), and the vertical axis denotes the frequency ratio of each operation pattern. FIG. 13 indicates that the frequency ratios of under normal operation and those of under abnormal operation completely have different distribution. For instance, at pattern numbers 12, 20, and 21, frequencies under abnormal operation (track tension strong) are high compared with those under normal operation (track tension weak). Among the three pattern numbers, the operation pattern number 21 has the highest frequency under abnormal operation, and FIG. 14 shows the details of the operational data patterns thereof. The dominating operation patterns are right crawler backward operation and left crawler forward operation, which indicates that abnormal operation that causes the track tension (pressure) to increase is occurring upon counterclockwise rotation of the shovel. Through such a process, abnormal operation can be detected and the operational data patterns associated therewith can be found, which contribute to abnormality detection and cause analysis.

As described above, according to this embodiment, even if the similarity between the input signals under normal operation and those under abnormal operation is strong, an appropriate diagnosis can be executed without causing a determination error.

Figure 15:
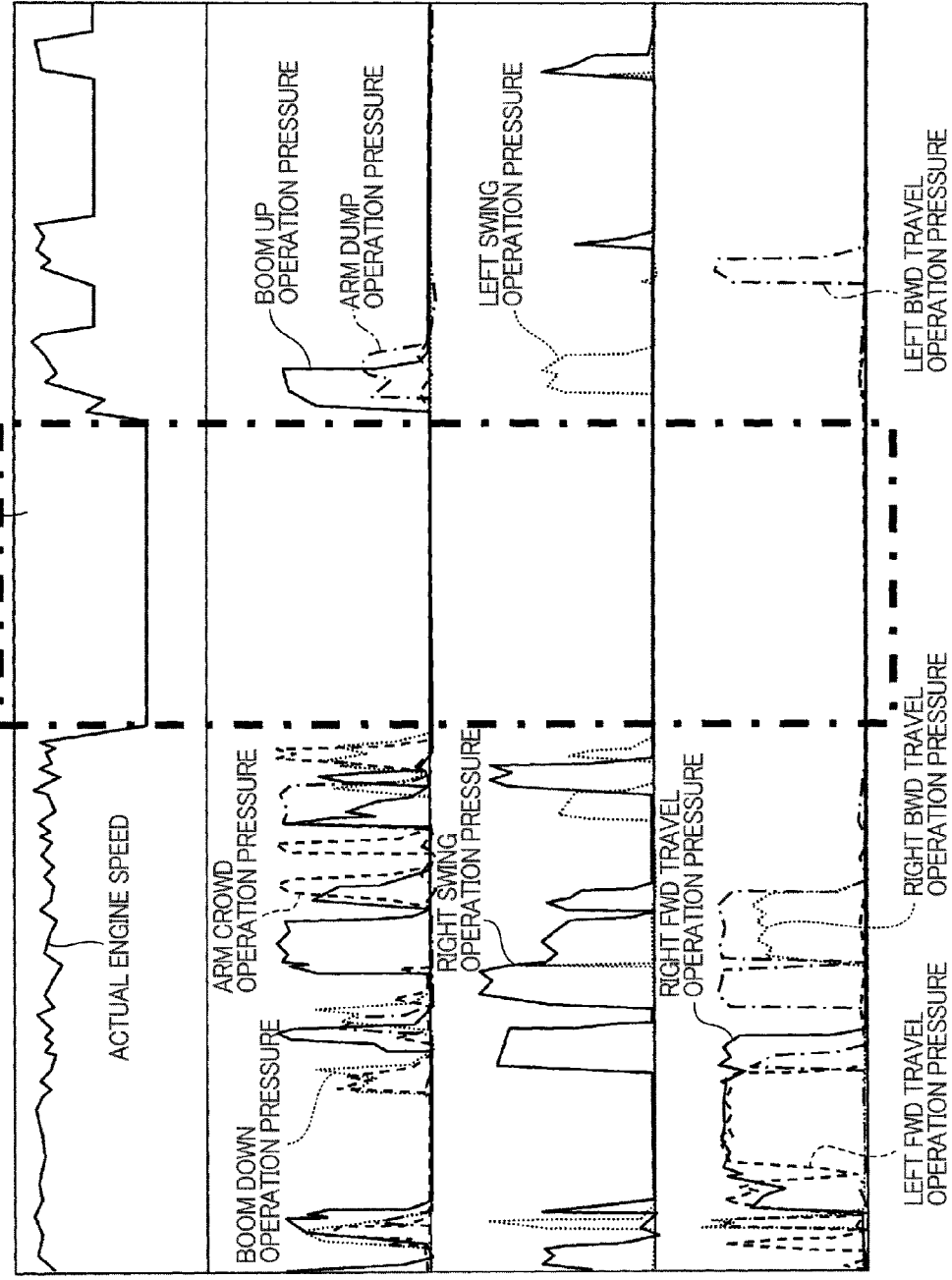
FIG. 15 is a diagram that shows sensor values of operating pressures and operational states of the engine measured in a time period that includes a non-operating period of the hydraulic excavator.

FIG. 15 shows the change in the operational state of the engine and the sensor values of the operating pressures for various kinds of operations of the hydraulic excavator. This graph indicates that the rotational speed of the engine which drives the main pump so as to produce hydraulic pressure is changing according to the operation of the hydraulic excavator. In the non-operating time zone 1501, since no operation occurs, the engine is also running in a low-speed range. The rate at which a non-operating time zone occurs may change from time to time, so it is suitable that only the time during which a machine is operating be target of monitoring and diagnosing. Therefore, only the operational data obtained while work was being carried out may be analyzed referring to the operational state of the engine or the operating pressure sensor values.

Figure 16:
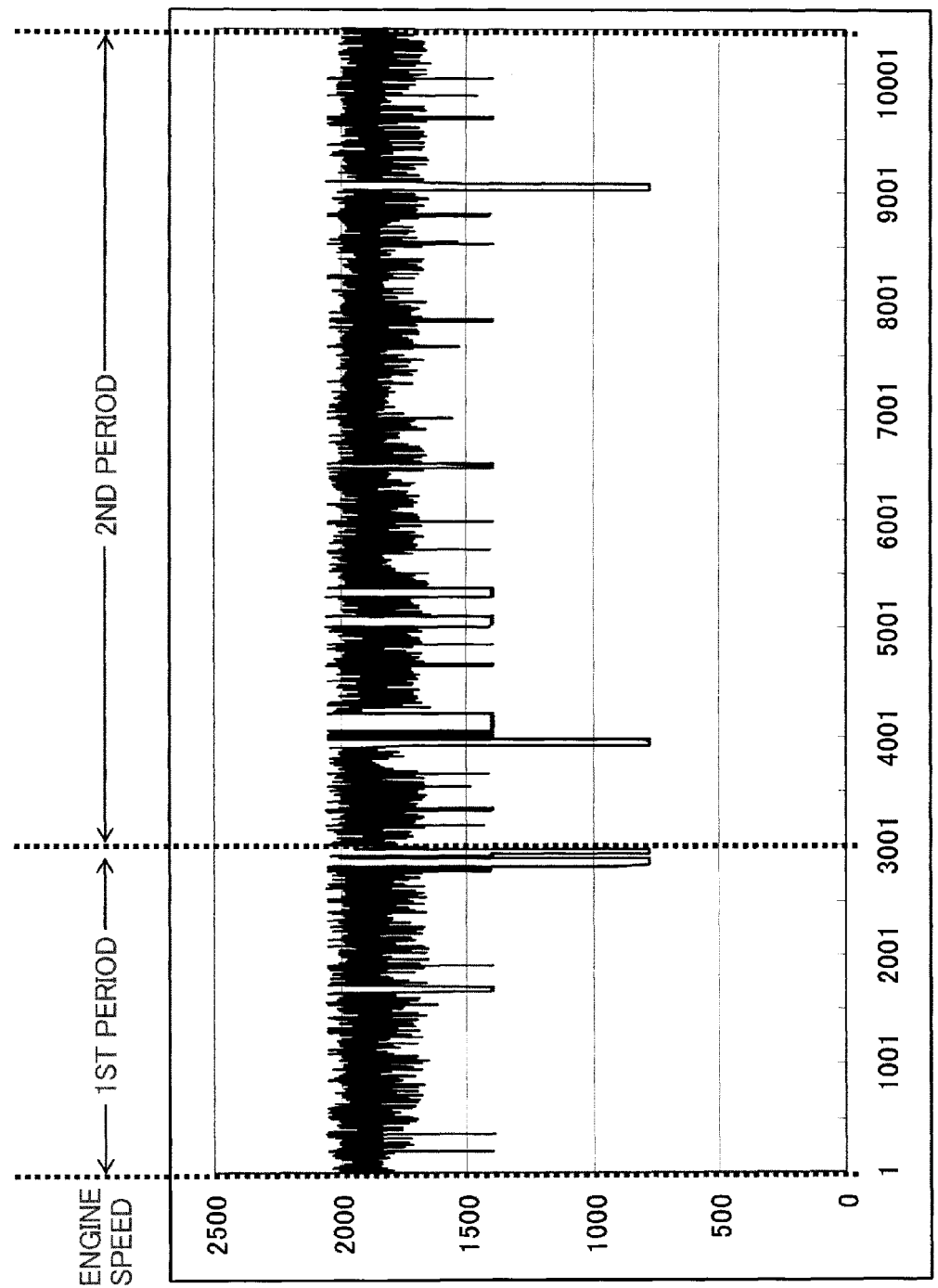
FIG. 16 is a diagram that shows the engine operational states of the hydraulic excavator in two divided periods of time (a first period and a second period)
Figure 17:
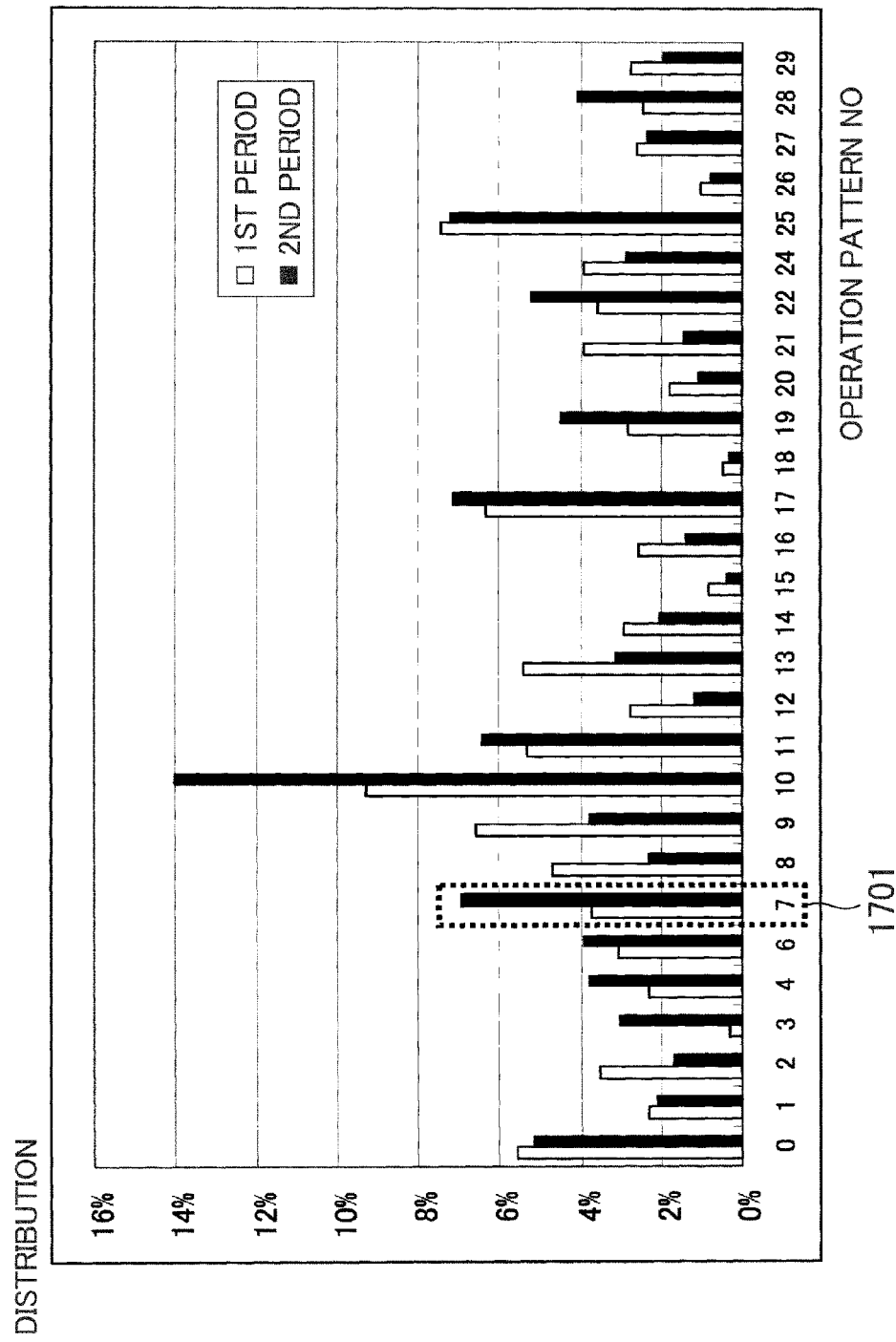
FIG. 17 is a diagram that shows the operation patterns and their frequencies observed in the two periods shown in FIG. 16.
Figure 18:
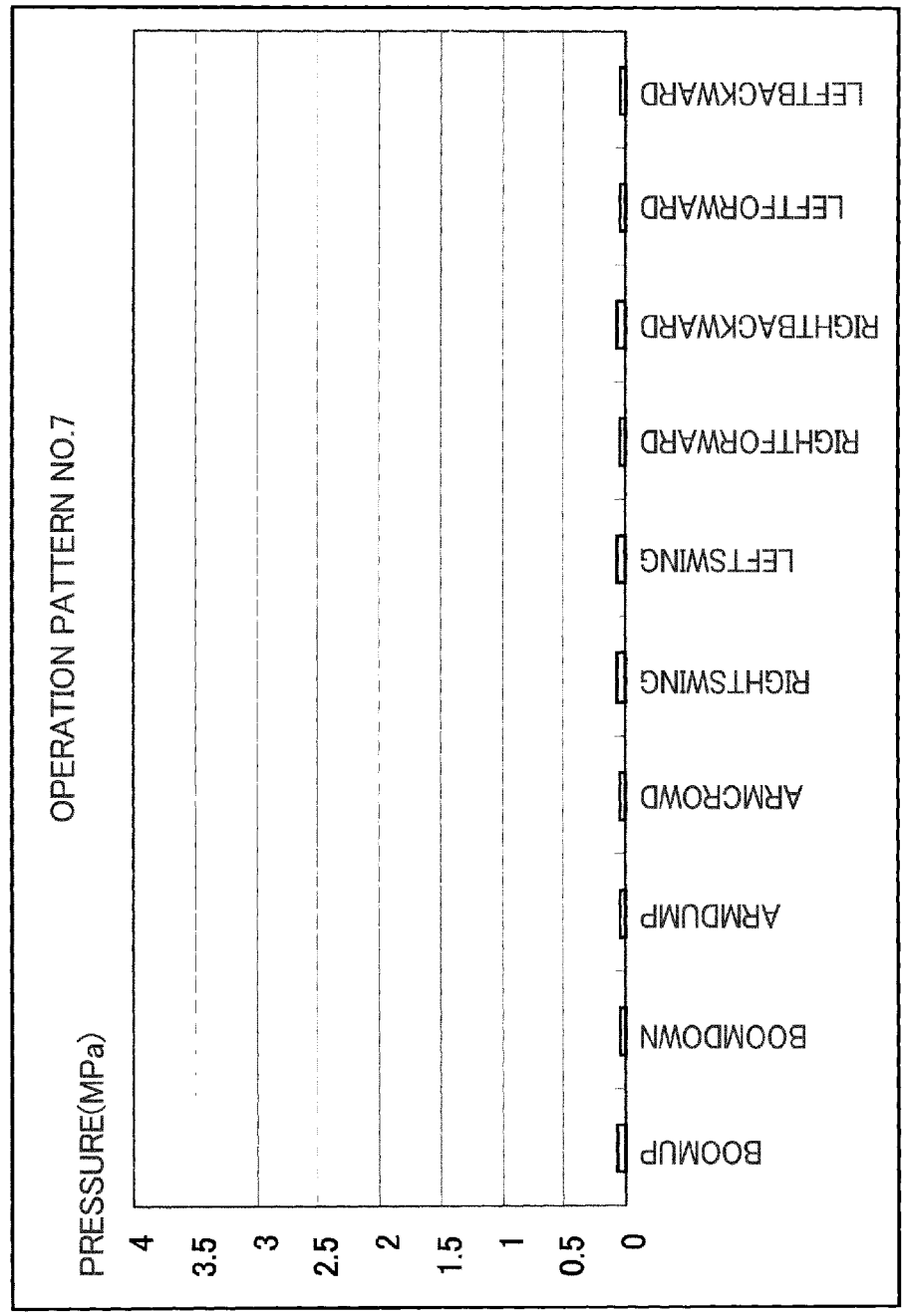
FIG. 18 is a diagram indicating that an operation pattern whose frequency has increased in the second period relative to that in the first period represents a "non-operating state" in which no operation is performed by the hydraulic excavator.

FIG. 16 shows the operational states of the engine in the hydraulic excavator divided in two periods of time, namely, the first and second period. In FIG. 17, operation patterns and their respective frequencies are shown for each of the two periods. Focusing on the frequencies 1701 of the two of the operation pattern 7 in FIG. 17, the frequency is higher in the second period than that in the first period. As FIG. 18 shows the operation pattern 7 is a pattern indicative of a non-operating state in which no hydraulic excavator operation is underway. That is to say, it can be considered that the non-operating time period has increased in the second period compared to that in the first period, and such an operation pattern should not be taken into account.

In this embodiment, the user can exclude, from all classification data (reference classification information), the classification data corresponding to a non-operating time. Selecting the other classification data, the data classifier section 101 can generate operational data classification information (nearest-neighbor classification numbers and normalized statistical distances) with the classification data and diagnostic data corresponding to a non-operating time removed. This allows the frequency comparator section 104 in FIG. 1 to derive more accurate frequencies "hi" or frequency ratios "ei" insusceptible to a non-operating time, and thus enables an appropriate diagnosis low in determination error rate.

Figure 19:
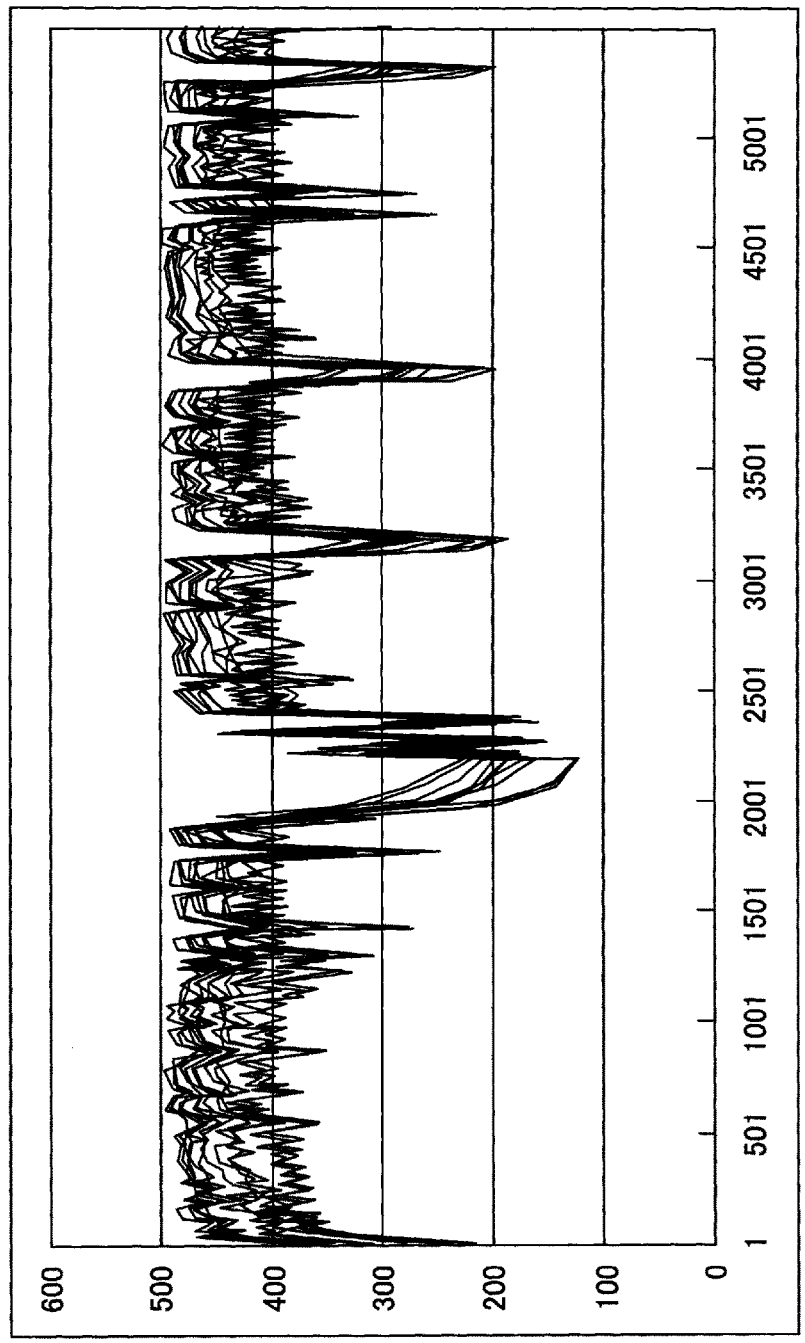
FIG. 19 is a diagram that shows exhaust temperature sensor values (operational data) of each engine cylinder in the hydraulic excavator measured by the temperature sensors and recorded and monitored by the vehicle body controller in a third period of time, the diagram showing the operational data obtained during a normal operation.
Figure 20:
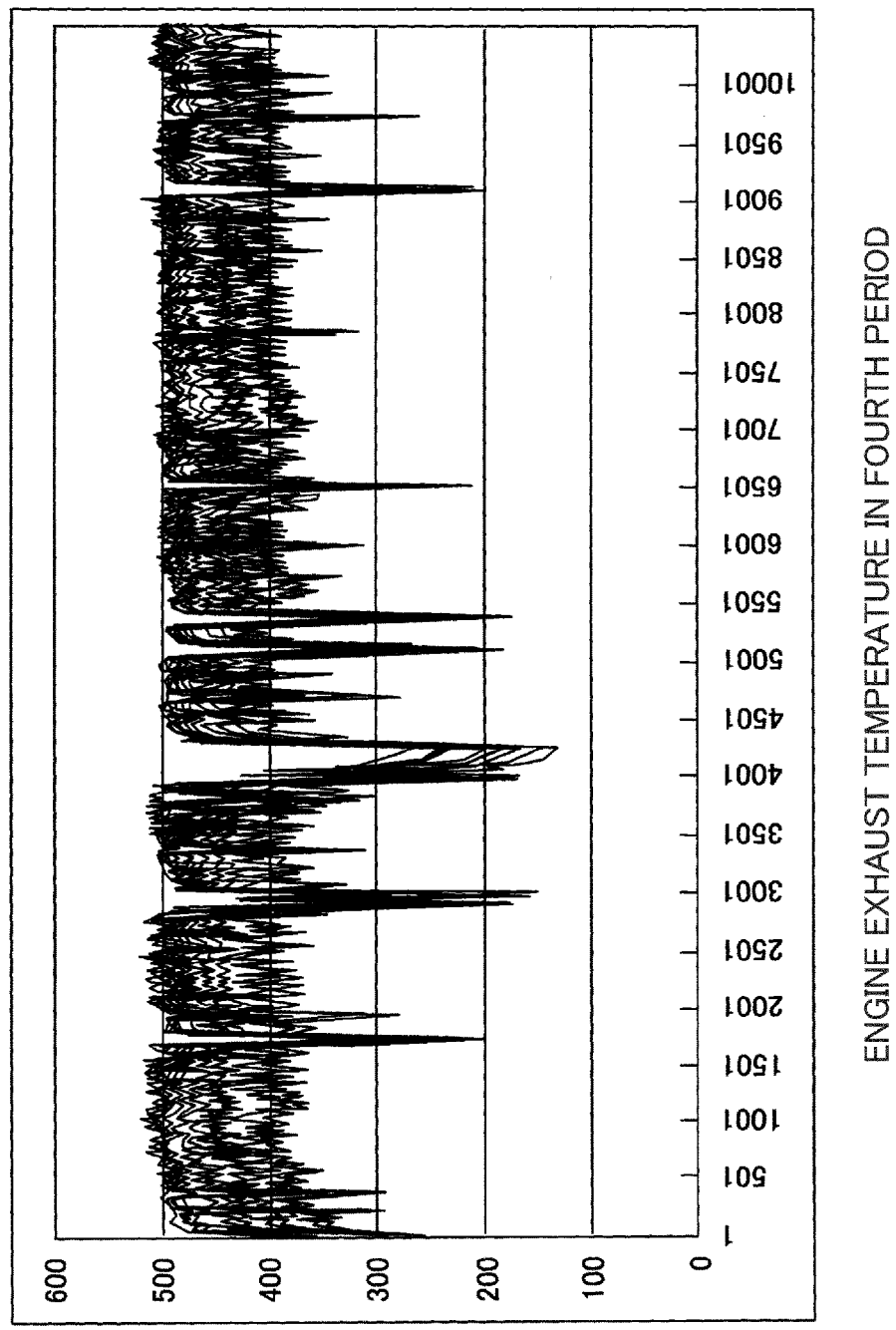
FIG. 20 is a diagram that shows exhaust temperature sensor values (operational data) of each engine cylinder in the hydraulic excavator measured by the temperature sensors and recorded and monitored by the vehicle body controller in a fourth period of time, the diagram showing the operational data obtained during an abnormal operation.
Figure 22:
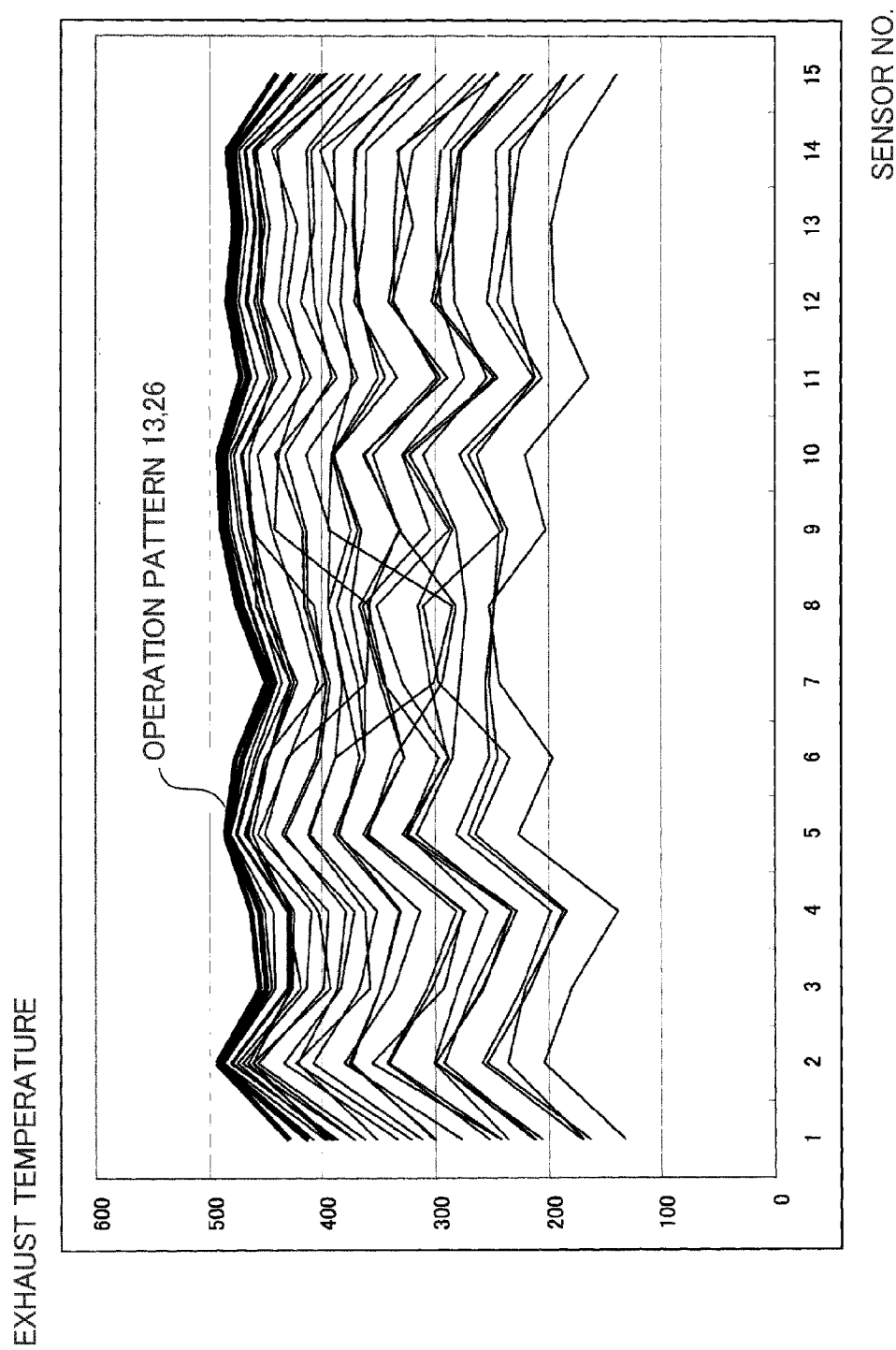
FIG. 22 is a diagram that shows the relation of operation patterns and cylinder exhaust temperatures of the engine measured during the abnormal operation.

FIGS. 19 and 20 are diagrams showing temperature sensor values (operational data) of the exhaust temperature of each engine cylinder in the hydraulic excavator measured in different periods of time by the temperature sensors 35a-35n and then recorded and monitored by the vehicle body controller 22 (the monitoring and diagnosing device 1). FIG. 19 shows the operational data obtained in a third period during normal operation, and FIG. 20 shows the operational data obtained in a fourth period during abnormal operation. The frequencies of the operation patterns (classification data of operational data) in the third and fourth periods are compared in FIG. 21. As shown in FIG. 21, the frequencies of the two of the operation patterns 13 and 26 differ significantly, and referring to FIG. 22 which shows the exhaust temperature of each operation pattern in abnormal operation (fourth period), the temperature sensor values of the operation patterns 13 and 26 are higher than any other operation patterns. This indicates that the engine exhaust temperature distribution differ between the two periods.

As described above, according to this embodiment, abnormality can be detected by comparing the frequencies of the operation patterns of the hydraulic excavator with standard data.

Second Embodiment

Figure 23:
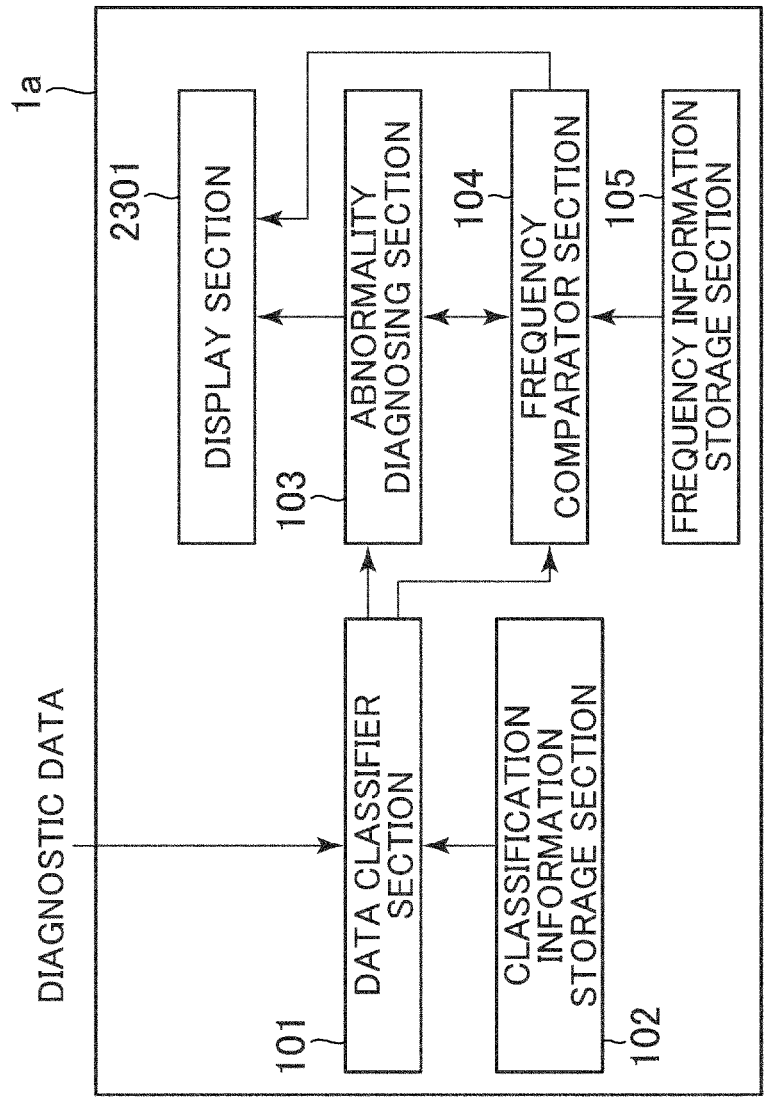
FIG. 23 is a diagram showing the configuration of a monitoring and diagnosing device according to a second embodiment of the present invention.

FIG. 23 is a diagram showing the configuration of a monitoring and diagnosing device according to a second embodiment of the present invention.

The monitoring and diagnosing device 1a is such that a display unit 2301 is added to the configuration shown in FIG. 1. The display unit 2301 can be, for example, the display 31 shown in FIG. 9, or if the monitoring and diagnosing device 1a is installed in the personal computer 11, the display unit 2301 can be the display of the personal computer 11. The display unit 2301 receives the output from the frequency comparator section 104 or the abnormality diagnosing section 103 and displays the contents of the output.

Figure 24:
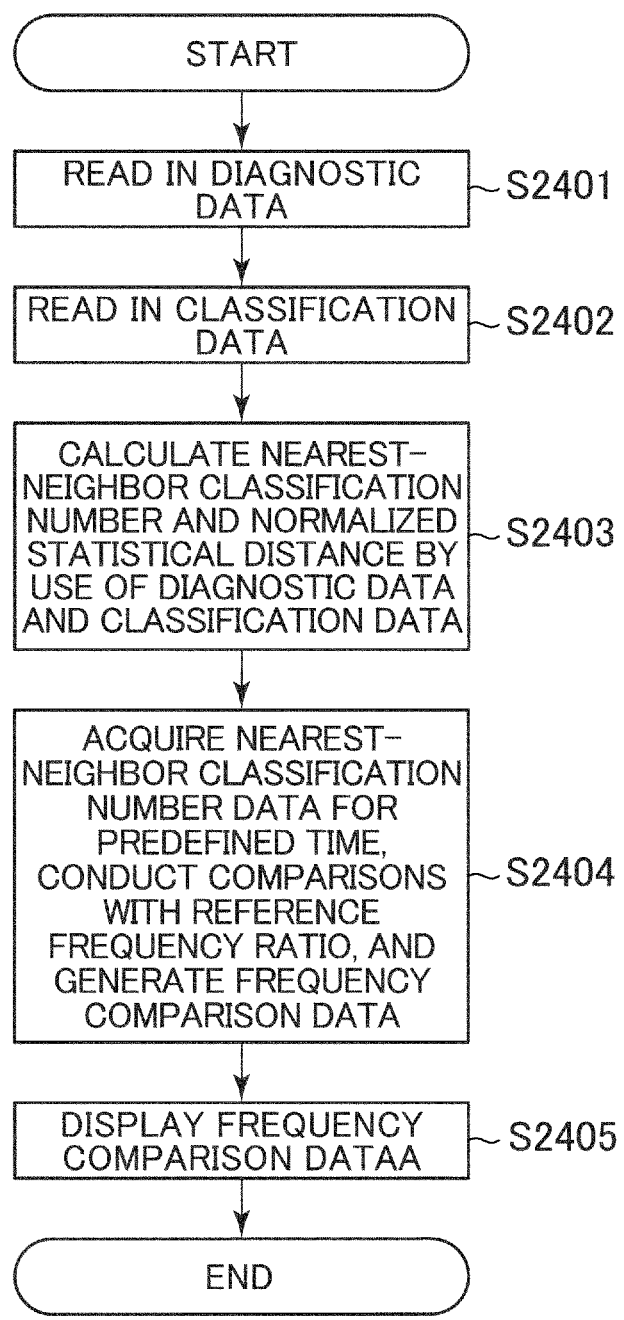
FIG. 24 is a diagram showing a process flow relative to display of operational data frequency comparison information generated by a frequency comparator section, which is one of the processing functions of the monitoring and diagnosing device shown in FIG. 23.

FIG. 24 shows the process flow relative to displaying of the operational data frequency comparison information generated by the frequency comparator section 104, which is one of the processing functions of the monitoring and diagnosing device shown in FIG. 23.

In the monitoring and diagnosing device 1a, the data classifier section 101 reads in diagnostic data from an external element (step s2401) and also reads in classification data from the classification information storage section 102 (step s2402). After that, the data classifier section 101 compares the diagnostic data and the classification data and generates nearest-neighbor classification number data and normalized statistical distance data (step s2403). The frequency comparator section 104 receives and compiles the nearest-neighbor classification number data from the data classifier section 101 at a predetermined duration of time. Reference frequency ratios are read in from the frequency information storage section 105 to compare therewith the frequency ratios of the compiled nearest-neighbor classification numbers, thereby generating frequency comparison data (step s2404). Finally, the display unit 2301 receives the frequency comparison data from the frequency comparator section 104 and displays it in such a display format as in FIG. 21 (step s2405). In the display example of FIG. 21, the reference frequency ratio 2101 (reference frequency information) and the compiled frequency ratio 2102 are displayed for each classification number respectively.

Display of frequency comparison data on the display unit 2301 in a display format as above enables abnormality detection to be determined or verified based on the user's judgment.

Figure 25:
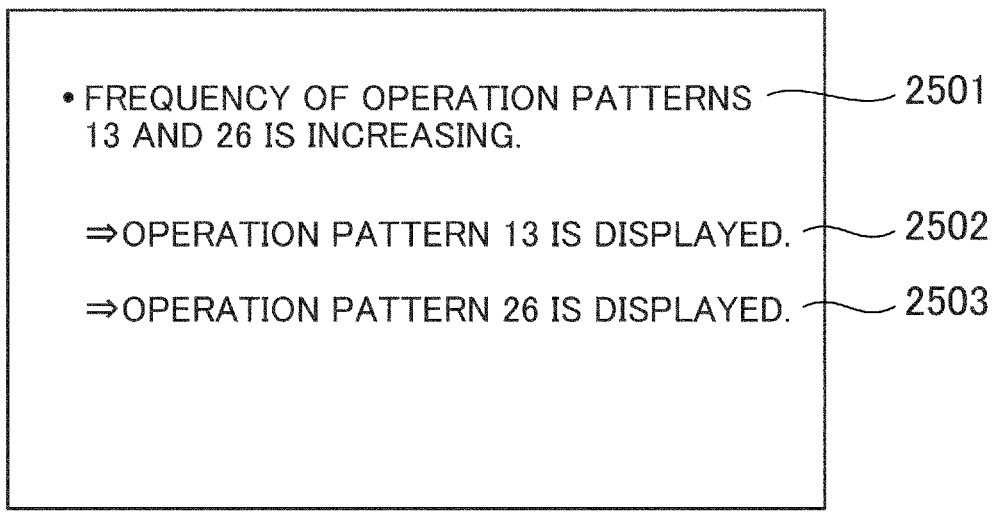
FIG. 25 is a diagram that shows diagnostic results output from an abnormality diagnosing section, and the diagram is an example of an output screen image displayed when it has been judged that there is an abnormality by comparing the frequency ratio data and the reference frequency ratio data of frequency comparison data such as that shown in FIG. 21.
Figure 26:
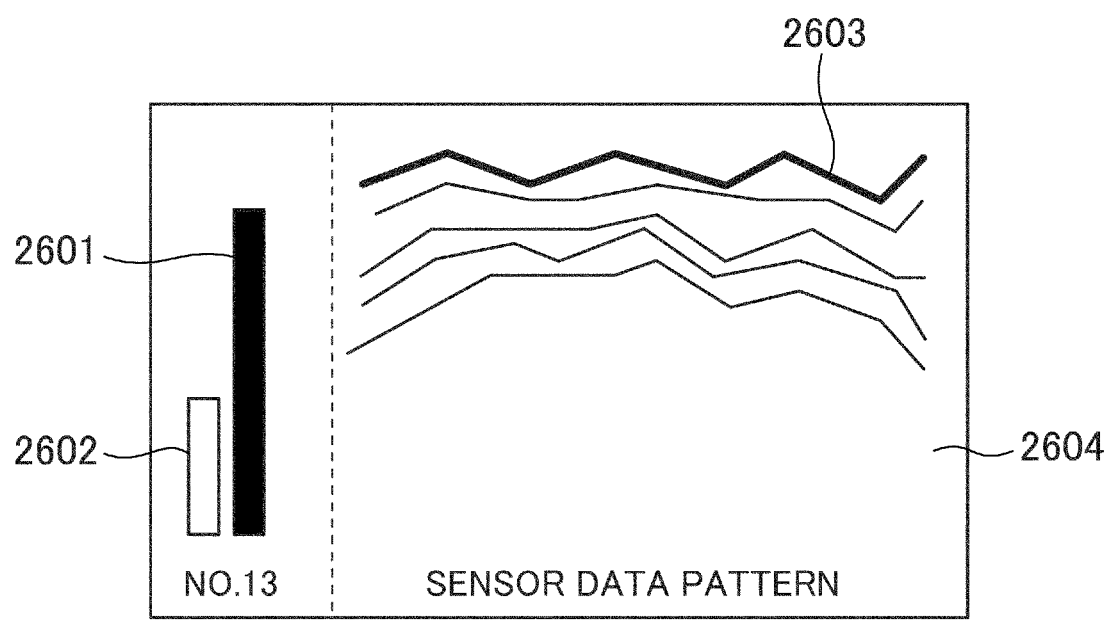
FIG. 26 is a diagram showing a detailed information display screen displayed when the upper reference link specification item shown in FIG. 25 is selected.

FIG. 25 shows diagnostic results output from the abnormality diagnosing section 103, which is an example of an output screen display of when it has been determined that the frequency ratio data 2102 has an abnormality as a result of comparison with the reference frequency ratio data 2101 (reference frequency information) from the frequency comparison data as shown in FIG. 21. In this example, increase in the frequencies of operation patterns 13 and 26 are displayed, which correspond to the graphical representation of the frequency data for "13" and "26" in "Operation Pattern No" of FIG. 21. Reference link specification items 2502 and 2503 are specified to display detailed information on the operation patterns 13 and 26, respectively. For example, if reference link specification 2502 is selected, such a detailed information display screen 2604 as shown in FIG. 26 appears. The user can view detailed information on the operation pattern 13 and confirm the increase tendency of the operation pattern by checking frequency data 2601 and reference frequency ratio data 2602. At the same time, information on the sensor data can be viewed as a sensor data pattern 2603 which corresponds to that of the same operation pattern 13 showed in FIG. 22. In this example, sensor data patterns of other operation patterns are also displayed from a viewpoint of comparative display.

Figure 27:
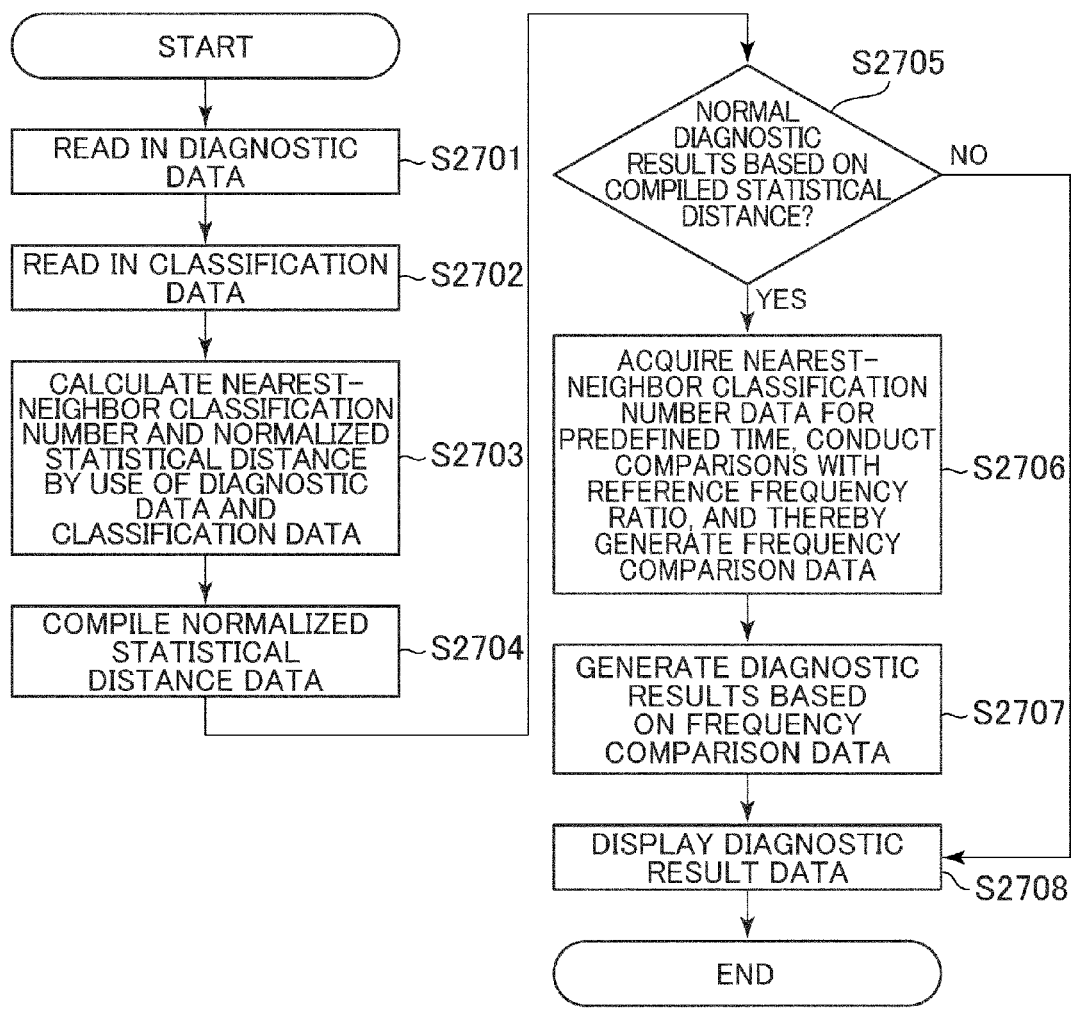
FIG. 27 is a diagram showing a process flow relative to display of diagnostic result data generated by the abnormality diagnosing section 103, which is one of the processing functions of the monitoring and diagnosing device shown in FIG. 23.

Operation relative to FIGS. 25 and 26 is described below using the configuration diagram of FIG. 23 and the flow diagram of FIG. 27. FIG. 27 shows a process flow of display of diagnostic result data generated by the abnormality diagnosing section 103, which is one of the processing functions of the monitoring and diagnosing device shown in FIG. 23.

In the monitoring and diagnosing device 1a, the data classifier section 101 reads in diagnostic data from an external element (step s2701) and also reads in classification data from the classification information storage section 102 (step s2702). After that, the data classifier section 101 compares the diagnostic data and the classification data and generates nearest-neighbor classification numbers and normalized statistical distances (step s2703). Next, the abnormality diagnosing section 103 receives the normalized statistical distances from the data classifier section 101 and compiles them at a predetermined duration of time (step s2704), and then performs abnormality diagnosis (step s2705). When the operational data is determined to be abnormal, process skips to step s2708. The result of the diagnosis, that the operational data was judged to be abnormal by the abnormality diagnosis according to statistical distances, is output to the display unit 2301 as the diagnostic result data and displayed thereon (step s2708). Conversely, when the operational data is determined to be normal as a result of diagnosis on the compiled normalized statistical distances, process proceeds to step s2706. The frequency comparator section 104 receives and compiles the nearest-neighbor classification numbers from the data classifier section 101 at a predetermined duration. Reference frequency ratios are read in from the frequency information storage section 105 to compare therewith the frequency ratios of the compiled nearest-neighbor classification numbers, thereby generating frequency comparison data (step s2706). The abnormality diagnosing section 103 generates diagnostic results according to the frequency comparison data (step s2707), and outputs to the display unit 2301 as the diagnostic result data that the abnormality diagnostic result according to statistical distances is normal, and in addition, outputs whether the abnormality diagnostic result according to frequency ratios indicates the operational data to be normal or abnormal. The display unit 2301 receives the diagnostic result data and displays them (step s2708).

The monitoring and diagnosing device 1a shown in FIG. 23 incorporates the abnormality diagnosing section 103 and the monitoring and diagnosing device 1a itself detects abnormality. Alternatively, the monitoring and diagnosing device 1a may not incorporate the abnormality diagnosing section 103 and instead be configured to display only the frequency comparison data that the frequency comparator section 104 outputs. A monitoring and diagnosing device 1a configured as such can also implement abnormality detection based on the user's judgment as described above.

Figure 28:
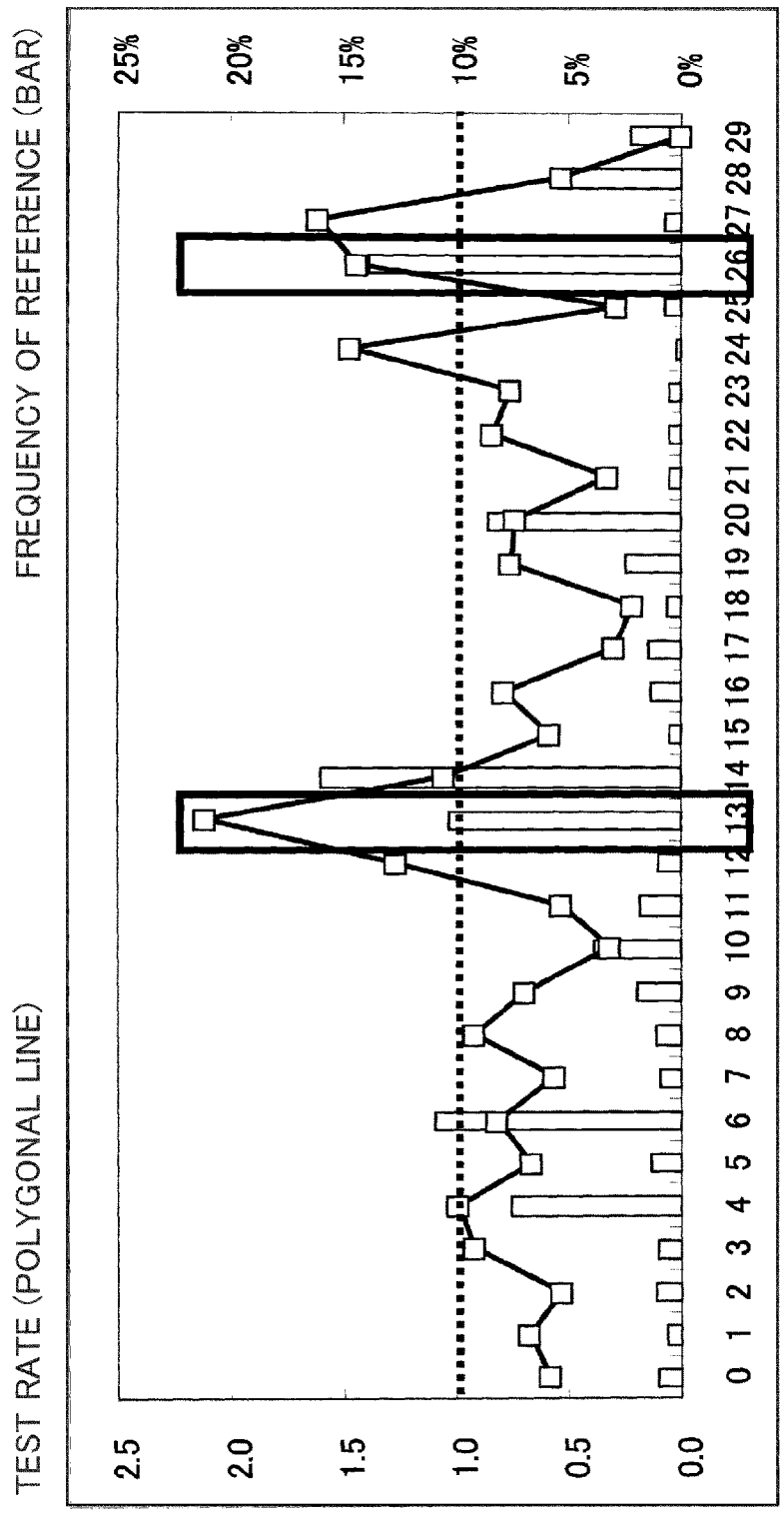
FIG. 28 shows another display example of frequency comparison data.

FIG. 28 shows another display example of frequency comparison data. In this figure, the polygonal line denotes the frequency comparison data of the operation patterns of the exhaust temperature sensor data obtained in the hydraulic excavator in the third and fourth periods shown in FIGS. 19 and 20, calculated according to Expression 7 (test rate or "Rate"), whereas the bar graph denotes the reference frequency ratios used in Expression 7 (i.e., the reference frequency ratios 2101 in FIG. 21). In this example, attention needs to be paid to the operation patterns 13 and 26, because while the operation patterns having high frequencies are patterns such as 13, 14, and 26, patterns whose test ratio exceeds one among them, in other words, whose test ratio has increased, are the two operation patterns 13 and 26.

Figure 29:
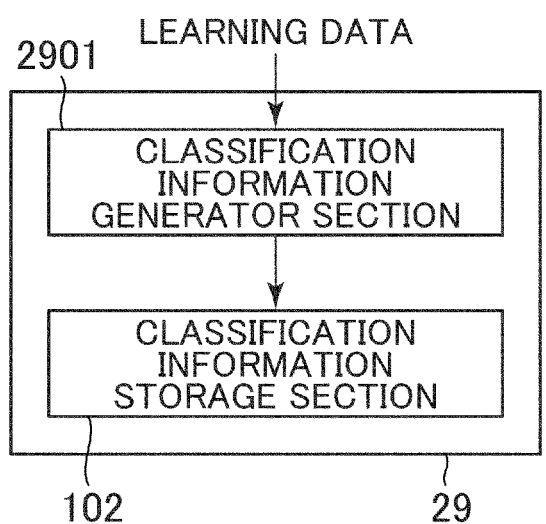
FIG. 29 is a diagram showing the configuration of a classification information generating device 29.

FIG. 29 shows the configuration of a classification information generating device 29. The classification information generating device 29 includes a classification information generator section 2901 and a classification information storage section 102.

As learning data is input from an external element, the classification information generator section 2901 generates classification data from the learning data in accordance with a setting value previously held in the classification information generator section 2901. More specifically, the classification information generator section 2901 uses a method, such as k-means, to calculate clusters of the learning data and derive center-of-gravity coordinates in each cluster, and then holds the center-of-gravity coordinates for each data item as shown in FIG. 3. Here, each classification data assigned with a specific classification number corresponds to the information of each cluster. During the cluster calculation, the radius of each cluster are also derived and held. The radius is derived by, for example, calculating the Euclidean distances between the center-of-gravity coordinates and the respective data belonging to each cluster using Expression 3, and the average or maximum value of those Euclidean distances is used as the radius. The setting value previously held in the classification information generator section 2901 corresponds to, when the k-means method is used, the number of classified clusters. In the case of FIG. 3, the previously held setting value, that is, the number of clusters is "m", which means that "m" clusters (sets of classification data) are generated. The data item values and radius of each calculated classification (cluster) are output to the classification information storage section 102 to be recorded and saved.

Figure 30:
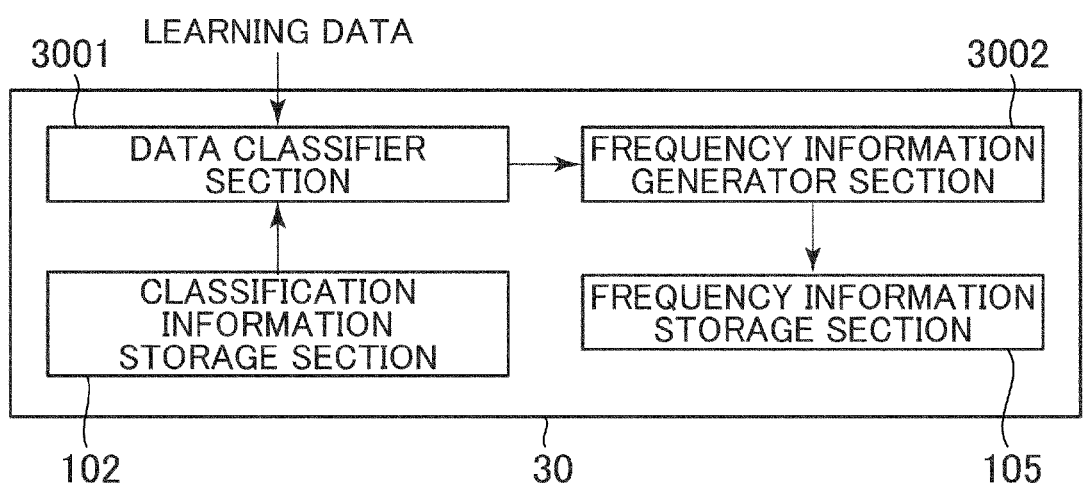
FIG. 30 is a diagram showing the configuration of a frequency information generating device 30.

FIG. 30 shows the configuration of a frequency information generating device 30. The frequency information generating device 30 includes a data classifier section 3001 (a second data classifier section), a classification information storage section 102, a frequency information generator section 3002, and a frequency information storage section 105. The data classifier section 3001 has the same functions as that of the data classifier section 101 included in the monitoring and diagnosing device 1.

As learning data is input from an external element, the data classifier section 3001 reads out the classification data previously stored in the classification information storage section 102, classifies the learning data, and outputs the classification numbers in order as in FIG. 4. The frequency information generator section 3002 receives the classification numbers that the data classifier section 3001 has output in association with the learning data, generates frequency data as in FIG. 5, and outputs the frequency table data to the frequency information storage section 105 wherein the data is saved.

Figure 31:
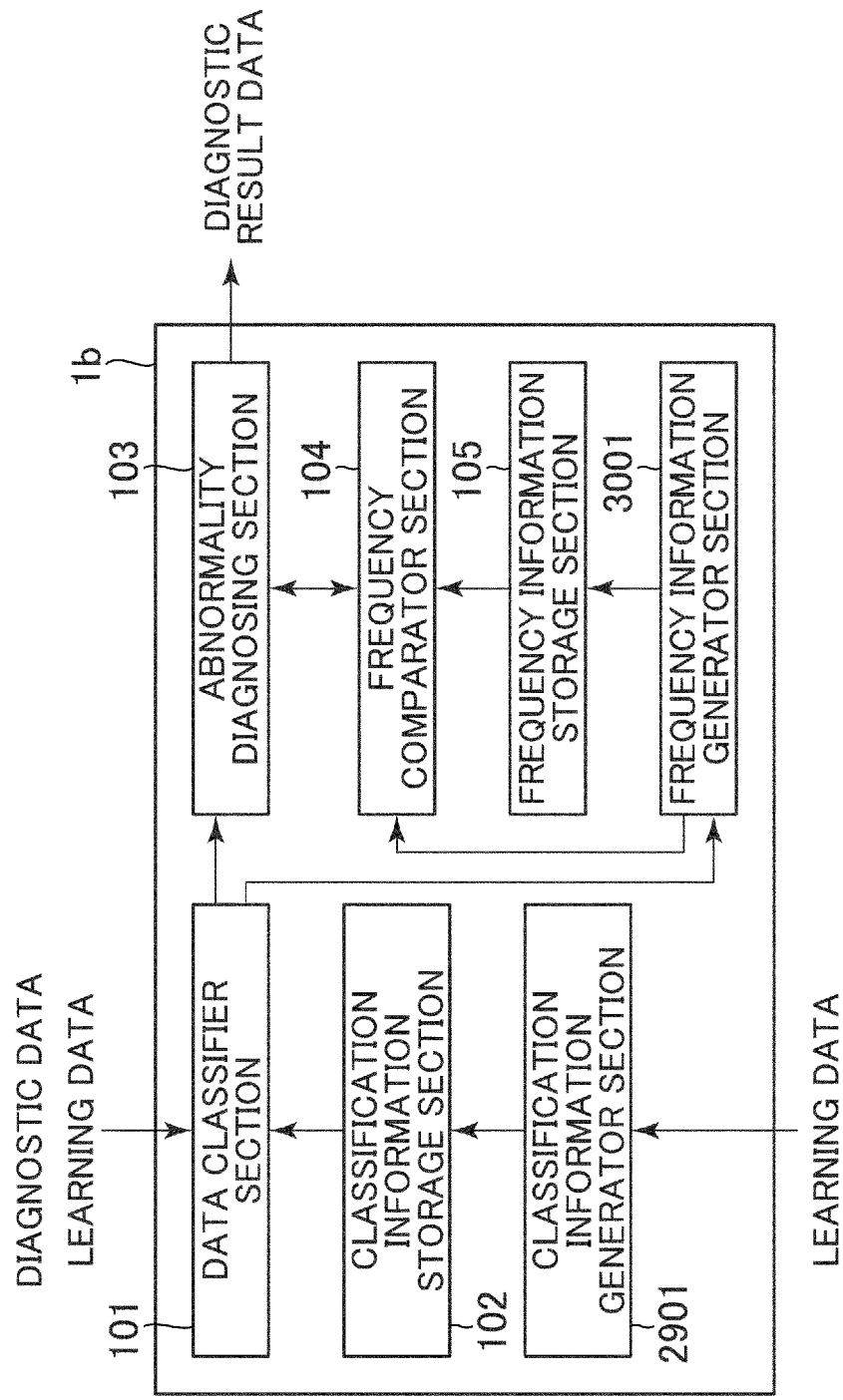
FIG. 31 is a diagram showing an exemplary configuration of a monitoring and diagnosing device which is such that a frequency information generator section is incorporated in the monitoring and diagnosing device of FIG. 1 so that the monitoring and diagnosing device is provided with a function of a frequency information generating device.

FIG. 31 is a diagram showing the configuration of a monitoring and diagnosing device 1b which is implemented by endowing the monitoring and diagnosing device 1 with the functions of the classification information generating device 29 and the frequency information generating device 30. In the monitoring and diagnosing device 1b, the data classifier section 101 in the monitoring and diagnosing device 1 shown in FIG. 1 is shared with the data classifier section 3001 of the frequency information generating device 30, and the frequency information generating function, which has been included in the frequency comparator section 104 in the monitoring and diagnosing device 1, is separated as the frequency information generator section 3002.

Such configuration allows one device to perform both the creation of classification information and frequency information using learning data and the abnormality diagnosis of diagnostic data.

DESCRIPTION OF REFERENCE NUMBERS

1 Monitoring and diagnosing device
8 Hydraulic excavator
9 Data recorder
11 Personal computer
13 Wireless device
14 Antenna
21 Engine controller
22 Vehicle body controller
23 Monitor controller
24 Engine measuring unit
25 Hydraulic system measuring unit
27A First common communication line
27B Second common communication line
28 Electronic governor
29 Classification information generating device
30 Frequency information generating device
31 Display
34 Engine speed sensor
35*a*-35*n* Temperature sensors
36*a*-36*n* Pressure sensors
37 Pressure sensor
101 Data classifier section (First data classifier section)
102 Classification information storage section
103 Abnormality diagnosing section
104 Frequency comparator section
105 Frequency information storage section
501 Frequency table
601 Duration data
602 Reference frequency table
801 Bucket
802 Arm
803 Boom
804 Swinging mechanism
805 Crawler unit
805*a* Right crawler
805*b* Left crawler
806 Vehicle body
811, 812, 813 Hydraulic cylinders
1101 Track tension (pressure) abnormality
1201 Normalized statistical distance
1501 Non-operating time zone
2101 Reference frequency ratio data
2102 Frequency ratio
2502, 2503 Reference link specification
2601 Frequency data
2602 Reference frequency ratio data
2603 Sensor data pattern
2604 Detailed information display screen
2901 Classification information generator section
3001 Data classifier section (Second data classifier section)
3002 Frequency information generator section

The invention claimed is:

1. A device for monitoring and diagnosing abnormality of a working machine in which the monitoring and diagnosing device receives and inputs in time sequence operational data of the working machine detected by a plurality of sensors and performs abnormality diagnosis on the working machine using the received operational data, the monitoring and diagnosing device comprising:

a processor;
a memory coupled to said processor storing:
  a classification information storage section in which reference classification information is stored;
  frequency information storage section in which reference frequency information is stored;
  a first data classifier section which reads out the reference classification information from the classification information storage section, compares the operational data, which were detected by the plurality of sensors and inputted in time sequence, with the reference classification information to thereby classify the operational data, and then generates operational data classification information;
  a frequency comparator section which compiles the operational data classification information, generates operational data frequency information by adding, to the operational data classification information, appearance frequency information for each of the classifications of the operational data, reads out the reference frequency information from the frequency information storage section, and then generates operational data frequency comparison information by comparing the operational data frequency information with the reference frequency information; and
  an abnormality diagnosing section which performs dual abnormality diagnosis upon the working machine including a first abnormality diagnosis by use of the operational data classification information and a second abnormality diagnosis by use of the operational data frequency comparison information; and
a display unit which displays at least one of the operational data frequency comparison information generated by the frequency comparator section and diagnostic result data from the abnormality diagnosing section.

2. The device for monitoring and diagnosing abnormality of a working machine according to claim 1, wherein:
  the abnormality diagnosing section diagnoses that the operational data is abnormal when, as a result of an abnormality diagnosis upon the working machine using the operational data frequency comparison information, a predetermined difference is detected between the operational data frequency information and the reference frequency information; and
  the display unit displays the diagnostic results.

3. The device for monitoring and diagnosing abnormality of a working machine according to claim 2, wherein:
  the display unit displays, when the predetermined difference is detected between the operational data frequency information and the reference frequency information, part of the operational data classification information related with the difference.

4. The device for monitoring and diagnosing abnormality of a working machine according to claim 1, wherein:
  the first data classifier section extracts only pre-selected reference classification information of all the reference classification information stored in the classification information storage section, and also extracts only operational data associated with the pre-selected reference classification information of all the operational data detected by the plurality of sensors and inputted in time sequence, and then compares the extracted operational data with the extracted reference classification information to generate the operational data classification information.

5. The device for monitoring and diagnosing abnormality of a working machine according to claim 1, the device further comprising:
a classification information generator section which receives and inputs in time sequence operational data of the working machine detected by the plurality of sensors, compares the similarity of the operational data to each other so as to classify the operational data, and generates reference classification information which are stored into the classification information storage section.

6. The device for monitoring and diagnosing abnormality of a working machine according to claim 5, the device further comprising:
a second data classifier section which compares operational data, detected by the plurality of sensors and inputted in time sequence, with the reference classification information generated by the classification information generator section, classifies the operational data by the comparison, and generates operational data classification information; and
a frequency information generator section which compiles the operational data classification information, adds thereto appearance frequency information for each of the classifications of the operational data, and thus generates reference frequency information which are stored into the frequency information storage section.

7. A device for monitoring and diagnosing abnormality of a working machine in which the monitoring and diagnosing device receives and inputs in time sequence operational data of the working machine detected by a plurality of sensors and performs abnormality diagnosis on the working machine using the received operational data, the monitoring and diagnosing device comprising:
a processor;
a memory coupled to said processor storing:
a classification information storage section in which reference classification information is stored;
frequency information storage section in which reference frequency information is stored;
a first data classifier section which reads out the reference classification information from the classification information storage section, compares the operational data, which were detected by the plurality of sensors and inputted in time sequence, with the reference classification information to thereby classify the operational data, and then generates both normalized statistical distance data and nearest-neighbor classification number data, representing operational data classification information;
a frequency comparator section which compiles the nearest-neighbor classification number data of the operational data classification information, generates operational data frequency information by adding, to the nearest-neighbor classification number data of the operational data classification information, appearance frequency information for each of the classifications of the operational data, reads out the reference frequency information from the frequency information storage section, and then generates operational data frequency comparison information by comparing the operational data frequency information with the reference frequency information; and
an abnormality diagnosing section which performs dual abnormality diagnosis upon the working machine including a first abnormality diagnosis by use of the normalized statistical distance data of the operational data classification information and a second abnormality diagnosis by use of the operational data frequency comparison information; and
a display unit which displays at least one of the operational data frequency comparison information generated by the frequency comparator section and diagnostic result data from the abnormality diagnosing section.

8. The device for monitoring and diagnosing abnormality of a working machine according to claim 7, wherein:
the abnormality diagnosing section diagnoses that the operational data is abnormal when, as a result of an abnormality diagnosis upon the working machine using the operational data frequency comparison information, a predetermined difference is detected between the operational data frequency information and the reference frequency information; and
the display unit displays the diagnostic results.

9. The device for monitoring and diagnosing abnormality of a working machine according to claim 8, wherein:
the display unit displays, when the predetermined difference is detected between the operational data frequency information and the reference frequency information, part of the operational data classification information related with the difference.

10. The device for monitoring and diagnosing abnormality of a working machine according to claim 7, wherein:
the first data classifier section extracts only pre-selected reference classification information of all the reference classification information stored in the classification information storage section, and also extracts only operational data associated with the pre-selected reference classification information of all the operational data detected by the plurality of sensors and inputted in time sequence, and then compares the extracted operational data with the extracted reference classification information to generate the operational data classification information.

11. The device for monitoring and diagnosing abnormality of a working machine according to claim 7, the device further comprising:
a classification information generator section which receives and inputs in time sequence operational data of the working machine detected by the plurality of sensors, compares the similarity of the operational data to each other so as to classify the operational data, and generates reference classification information which are stored into the classification information storage section.

12. The device for monitoring and diagnosing abnormality of a working machine according to claim 11, the device further comprising:
a second data classifier section which compares operational data, detected by the plurality of sensors and inputted in time sequence, with the reference classification information generated by the classification information generator section, classifies the operational data by the comparison, and generates operational data classification information; and
a frequency information generator section which compiles the operational data classification information, adds thereto appearance frequency information for each of the classifications of the operational data, and thus generates reference frequency information which are stored into the frequency information storage section.

* * * * *